United States Patent
Qu et al.

(10) Patent No.: US 12,445,957 B2
(45) Date of Patent: Oct. 14, 2025

(54) OPERATION MODE INDICATION METHOD, APPARATUS, AND SYSTEM

(71) Applicant: HUAWEI TECHNOLOGIES CO., LTD., Shenzhen (CN)

(72) Inventors: Weilin Qu, Beijing (CN); Juan Zheng, Beijing (CN); Chaojun Li, Beijing (CN); Zhe Jin, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 270 days.

(21) Appl. No.: 18/155,881

(22) Filed: Jan. 18, 2023

(65) Prior Publication Data

US 2023/0156595 A1    May 18, 2023

Related U.S. Application Data

(63) Continuation of application No. PCT/CN2021/105631, filed on Jul. 10, 2021.

(30) Foreign Application Priority Data

Jul. 24, 2020   (CN) .......................... 202010723884.9

(51) Int. Cl.
*H04B 7/04*   (2017.01)
*H04B 7/0404*   (2017.01)
(Continued)

(52) U.S. Cl.
CPC ...... *H04W 52/0212* (2013.01); *H04B 7/0404* (2013.01); *H04B 7/0452* (2013.01); *H04L 5/0051* (2013.01)

(58) Field of Classification Search
CPC ........... H04W 52/0212; H04W 52/028; H04W 72/23; H04B 7/0404; H04B 7/0413;
(Continued)

(56) References Cited

U.S. PATENT DOCUMENTS

2011/0019776 A1 * 1/2011 Zhang ................... H04L 5/0023
                                                              375/340
2016/0095058 A1 * 3/2016 Lee .......................... H04B 7/04
                                                              370/311
(Continued)

FOREIGN PATENT DOCUMENTS

CN           108809609 A       11/2018
WO    WO-2011087417 A1 *    7/2011   ........... H04B 7/0452
WO       2020136416 A1       7/2020

OTHER PUBLICATIONS

Ericsson, "Conclusion on the need for CSI-RS and Dmrs Papr reduction", 3GPP TSG RAN WG1 Meeting #94bis, Chengdu, China, Oct. 8-12, 2018, R1-1811184, 15 pages.
(Continued)

*Primary Examiner* — Siu M Lee
(74) *Attorney, Agent, or Firm* — Maier & Maier, PLLC

(57) ABSTRACT

A multi-antenna operation mode indication method and an apparatus resolve a problem that increased power consumption and a resource waste are caused because a terminal device still operates in a multi-user multiple-input multiple-output (MU-MIMO) mode by default in a single-port transmission mode. The method includes: a network device sends indication information to a terminal device, to indicate that a multi-antenna operation mode of the terminal device is single-user multiple-input multiple-output (SU-MIMO) or MU-MIMO. The terminal device determines, based on the indication information from the network device, whether a demodulation reference signal (DMRS) port number corresponding to the terminal device and a DMRS port number not corresponding to the terminal device are allocated to another terminal device, to adjust the multi-antenna operation mode.

20 Claims, 5 Drawing Sheets

(51) Int. Cl.
    *H04B 7/0452* (2017.01)
    *H04L 5/00* (2006.01)
    *H04W 52/02* (2009.01)
(58) Field of Classification Search
    CPC .... H04B 7/0452; H04B 7/0628; Y02D 30/70;
        H04L 5/0007; H04L 5/0016; H04L
        5/0023; H04L 5/0048; H04L 5/0051;
        H04L 5/0053; H04L 5/0092
    See application file for complete search history.

(56) References Cited

U.S. PATENT DOCUMENTS

| | | | |
|---|---|---|---|
| 2020/0112478 A1* | 4/2020 | Manolakos | H04L 5/0037 |
| 2020/0136690 A1 | 4/2020 | Noh et al. | |
| 2023/0261833 A1* | 8/2023 | Zhu | H04L 5/0044 370/329 |

OTHER PUBLICATIONS

"3rd Generation Partnership Project; Technical Specification Group Radio Access Network; NR; Multiplexing and channel coding(Release 16)", 3GPP TS 38.212 V16.2.0 (Jun. 2020), 151 pages.
Ericsson, "New SID on support of reduced capability NR devices", 3GPP TSG RAN Meeting #86, Sitges, Spain, Dec. 9-12, 2019, RP-193238, 5 pages.

\* cited by examiner

OPERATION MODE INDICATION METHOD, APPARATUS, AND SYSTEM

CROSS-REFERENCE TO RELATED APPLICATIONS

This application is a continuation of International Application No. PCT/CN2021/105631, filed on Jul. 10, 2021, which claims priority to Chinese Patent Application No. 202010723884.9, filed on Jul. 24, 2020. The disclosures of the aforementioned applications are hereby incorporated by reference in their entireties.

TECHNICAL FIELD

The embodiments relate to the communication field, a multi-antenna operation mode indication method, and a device.

BACKGROUND

In a new radio (NR) communication system, information exchanged between a terminal device and a network device is carried through a physical channel. Control information, namely, downlink control information (DCI), sent by the network device may be carried on a physical downlink control channel (PDCCH). For downlink scheduling, the network device needs to configure a corresponding demodulation reference signal (DMRS) port for each antenna port of the terminal device. The DCI may indicate a quantity of DMRS code division multiplexing (CDM) groups and a DMRS port number.

An orthogonal frequency division multiplexing (OFDM) symbol in time domain and a subcarrier in frequency domain may form a time-frequency resource element. DMRSs are generally classified into a first-type DMRS and a second-type DMRS, and quantities of time-frequency resource elements corresponding to DMRS ports corresponding to the first-type DMRS and the second-type DMRS are different. Each DMRS CDM group includes a plurality of DMRS ports, and a quantity of time-frequency resource elements included in a time-frequency resource block corresponding to each DMRS CDM group is a sum of time-frequency resource elements corresponding to the plurality of DMRS ports included in the DMRS CDM group. For the NR system, the time-frequency resource block corresponding to each DMRS CDM group is used to carry DMRSs sent through the DMRS ports in the DMRS CDM group. When indicating one or more DMRS ports to the terminal device based on the DCI, the network device allocates other DMRS ports in a DMRS CDM group to which the one or more DMRS ports belong to one or more other terminal devices in the communication system. In this case, time-frequency resources corresponding to the other DMRS ports are also used for data transmission between the other terminal devices and the network device. In this configuration manner, the network device simultaneously sends data flows to a plurality of terminal devices on a given time-frequency resource, and the terminal device in the communication system operates in a multi-user multiple-input multiple-output (MU-MIMO) mode by default. Therefore, even if a multi-antenna operation mode of the terminal device is applicable to single-user multiple-input multiple-output (SU-MIMO), in this configuration manner, it is assumed that the terminal device operates in the MU-MIMO in the NR system. In actual operation, the terminal device needs to estimate an interference signal, and then demodulate information that is transmitted by using a DMRS port number corresponding to the terminal device. The interference signal may include, but is not limited to, downlink data or uplink data transmitted by using a DMRS signal corresponding to another terminal device and/or a DMRS port number corresponding to another terminal device. The downlink data is carried on a physical downlink shared channel (PDSCH), and the uplink data is carried on a physical uplink shared channel (PUSCH). This increases complexity and power consumption of the terminal device, and wastes resources.

SUMMARY

The embodiments may provide a communication method, to indicate a single-user multiple-input multiple-output (SU-MIMO) mode or a multi-user multiple-input multiple-output (MU-MIMO) mode, to resolve a problem in the existing technology that increased power consumption and a resource waste are caused because a terminal device still operates in a MU-MIMO mode by default in a single-port transmission mode.

According to a first aspect, the embodiments may provide a multi-antenna operation mode indication method. The method may be performed by a terminal device or may be performed by a chip or an integrated circuit applied to a terminal device. The following provides descriptions by using an example in which the method is performed by the terminal device. The method includes: A first terminal device receives first information from a network device, where the first information indicates a first multi-antenna operation mode of the first terminal device. The first terminal device receives second information from the network device, where the second information indicates a second multi-antenna operation mode of the first terminal device, and at least one first demodulation reference signal DMRS port number and a quantity N of demodulation reference signal DMRS code division multiplexing CDM groups that correspond to the second multi-antenna operation mode. The N DMRS CDM groups include the at least one first DMRS port number. The first terminal device determines, based on the first information and the second information, that the multi-antenna operation mode is the second multi-antenna operation mode.

Based on the foregoing solution, the first terminal device may determine an operation mode based on indication information of the network device, to resolve a problem in the existing technology that increased power consumption and a resource waste are caused because the first terminal device operates in a MU-MIMO mode by default.

In a possible implementation, the first information is carried in higher layer signaling, where the higher layer signaling may be radio resource control (Radio Resource Control, RRC) signaling or media access control (Media Access Control, MAC) signaling. The second information is carried in physical layer signaling, for example, downlink control information (Downlink Control Information, DCI).

Static scheduling is used in a static scenario, and the network device permanently specifies associated resources. Semi-persistent scheduling is used in a semi-static scenario, and the network device periodically allocates corresponding resources to the terminal device in a period of time through one resource configuration. Dynamic scheduling is used in a dynamic scenario, and the network device dynamically configures resources of the terminal device. Based on the optional manner, when the first terminal device executes a service through static or semi-static scheduling by the network device, and/or the first terminal device is used in the static or semi-static scenario, for example, a periodic service scenario in an industrial wireless sensor network (IWSN) and/or video surveillance, an operation manner of the first terminal device generally remains unchanged. The network device indicates the multi-antenna operation mode of the first terminal device by using higher layer signaling, to reduce overheads of physical layer signaling while ensuring system communication performance. When the first terminal device executes a service through dynamic scheduling by the network device, the first terminal device is used in the dynamic scenario, and/or the first terminal device is used in a scenario in which the first terminal device is paired with a terminal device in another dynamic scenario, for example, an aperiodic service scenario in an IWSN and/or video surveillance, the operation manner of the first terminal device may change frequently. The network device indicates the multi-antenna operation mode of the first terminal device by using physical layer signaling, to flexibly implement dynamic switching of the multi-antenna operation mode of the first terminal device. In another possible scenario, for example, in a scenario in which a static scenario or a semi-static scenario is combined with a dynamic scenario, or the scenarios frequently switch, the network device indicates the multi-antenna operation mode of the first terminal device by using higher layer signaling and physical layer signaling, so that the multi-antenna operation mode of the first terminal device can be flexibly configured.

For example, optionally, the first multi-antenna operation mode is configured for the first terminal device based on the first information. In this case, if the first multi-antenna operation mode is suitable for the first terminal device, and the network device configures the second information based on the first multi-antenna operation mode, the first terminal device operates in a first operation mode. If the first multi-antenna operation mode is unsuitable for the first terminal device, the network device may indicate, based on the second information, the second multi-antenna operation mode that is different from the first multi-antenna operation mode, and the first terminal device implements switching of the multi-antenna operation mode based on the second information. Alternatively, after the first terminal device operates in the first multi-antenna operation mode for a period of time, the multi-antenna operation mode applicable to the first terminal device changes. In this case, the network device adjusts from configuring the second information based on the multi-antenna operation mode indicated by the first information to configuring the second information based on the multi-antenna operation mode applicable to the first terminal device, and the first terminal device switches the multi-antenna operation mode based on the second information.

In a possible implementation, the N DMRS CDM groups include the at least one first DMRS port number and at least one second DMRS port number. The at least one second DMRS port number is different from the at least one first DMRS port number. For example, the N DMRS CDM groups are composed of the at least one first DMRS port number and the at least one second DMRS port number; or the N DMRS CDM groups include the at least one first DMRS port number and the at least one second DMRS port number, and may further include another port number.

In a possible implementation, the first information indicates SU-MIMO, and the second information indicates MU-MIMO; or the first information indicates MU-MIMO, and the second information indicates the MU-MIMO. In either of the two scenarios, the first terminal device determines that the multi-antenna operation mode is the MU-MIMO, and determines that the at least one second DMRS port number is allocated to a second terminal device. The second terminal device is at least one of remaining terminal devices other than the first terminal device in a communication system in which the first terminal device is located.

In a possible implementation, the first information indicates MU-MIMO, and the second information indicates SU-MIMO; or the first information indicates SU-MIMO, and the second information indicates the SU-MIMO. In either of the two scenarios, the first terminal device determines that the multi-antenna operation mode is the SU-MIMO, and determines that the at least one second DMRS port number is not allocated to a second terminal device. The second terminal device is at least one of remaining terminal devices other than the first terminal device in a communication system in which the first terminal device is located.

Based on this possible implementation, the first terminal device determines, based on the indication information of the network device, that the multi-antenna operation mode is the SU-MIMO. This resolves the problem in the existing technology that increased power consumption and a resource waste are caused because the first terminal device still operates in the MU-MIMO mode by default in a single-port transmission mode.

In a possible implementation, the first terminal device determines that the multi-antenna operation mode is the SU-MIMO. When the quantity N of DMRS CDM groups is greater than 1, the second information further indicates that a time-frequency resource corresponding to the at least one second DMRS port number is not used for data transmission or is used for data transmission between the first terminal device and the network device. Alternatively, if the second information does not indicate use of the time-frequency resource, the method further includes: The first terminal device may further receive third information, where the third information indicates that a time-frequency resource corresponding to the at least one second DMRS port number is not used for data transmission or is used for data transmission between the first terminal device and the network device.

Based on this possible implementation, if the second information or the third information indicates that the time-frequency resource corresponding to the at least one second DMRS port number is not used for data transmission, a DMRS of the first terminal device can obtain a power enhancement benefit. This helps improve channel estimation performance. If a transmit power of the network device remains unchanged, and no data is transmitted on the time-frequency resource corresponding to the at least one second DMRS port number, the network device sends the DMRS to the first terminal device in the transmit power. In this way, a signal-to-noise ratio of the DMRS received by the first terminal device can be improved, thereby improving channel estimation performance. If the second information or the third information indicates that the time-frequency resource corresponding to the at least one second DMRS port number is used for data transmission between the first terminal device and the network device, a resource waste is avoided.

In a possible implementation, a time domain length of data transmission between the first terminal device and the network device is greater than a length of two OFDM symbols. The data may be carried on a PDSCH. Optionally, the data transmission is a single transmission or one data transmission between the network device and the first terminal device.

Based on this possible implementation, when the time domain length of data transmission between the first terminal device and the network device is greater than the length of the two OFDM symbols, configuration information of the network device indicates the multi-antenna operation mode of the first terminal device and use of the time-frequency resource corresponding to the at least one second DMRS port number. In this case, the multi-antenna operation mode of the first terminal device may be the SU-MIMO or the MU-MIMO. When the time domain length of data transmission between the first terminal device and the network device is not greater than the length of the two OFDM symbols, because a quantity of OFDM symbols used for data transmission is small, in this case, the first terminal device may assume that the time-frequency resource corresponding to the at least one second DMRS port number is not used for data transmission, and only data between the network device and the first terminal device is transmitted on a given time-frequency resource. In this case, the multi-antenna operation mode of the first terminal device is the SU-MIMO. In this way, efficiency of data transmission that is between the first terminal device and the network device and that is in a small time domain length can be ensured.

In a possible implementation, the first terminal device sends fourth information to the network device, to indicate at least one of the following:
an application scenario of the first terminal device;
a type of the first terminal device; and
capability information of the first terminal device.

Optionally, the application scenario of the first terminal device includes at least one of an industrial wireless sensor network (IWSN) and video surveillance. The type of the first terminal device includes a reduced capability (REDCAP) terminal device, for example, at least one of an industrial wireless sensor, a video surveillance camera, or a wearable device. The capability information of the first terminal device includes that the multi-antenna operation mode supported by the first terminal device is the SU-MIMO and/or the MU-MIMO.

Based on this possible implementation, the first terminal device reports information, so that the network device configures, based on the application scenario of the first terminal device, the type of the first terminal device, or the capability information of the first terminal device, information for indicating the multi-antenna operation mode. This resolves a problem in the existing technology that increased power consumption and a resource waste are caused because the first terminal device operates in the MU-MIMO mode by default and the operation mode of the first terminal device may not match an actually applicable operation mode of the first terminal device. It should be noted that, generally, an application scenario corresponds to a service type. Therefore, the network device may determine, based on the application scenario of the first terminal device, a multi-antenna operation mode indicated by the configuration information. If one or more application scenarios include service types applicable to different multi-antenna operation modes, the application scenario reported by the first terminal device is an application scenario corresponding to the service type. For example, if the application scenario such as the IWSN and/or video surveillance further includes a periodic service and an aperiodic service, the application scenario reported by the first terminal device is an IWSN and/or video surveillance corresponding to the periodic service, or the application scenario reported by the first terminal device is an IWSN and/or video surveillance corresponding to the aperiodic service.

According to a second aspect, the embodiments may provide a communication method. The method may be performed by a terminal device, or may be performed by a chip or an integrated circuit applied to a terminal device. The following provides descriptions by using an example in which the method is performed by the terminal device. The method includes: A first terminal device receives fifth information from a network device, where the fifth information indicates that a multi-antenna operation mode of the first terminal device is SU-MIMO or MU-MIMO. The first terminal device determines, based on the fifth information, that the multi-antenna operation mode is the SU-MIMO or the MU-MIMO.

The fifth information further indicates at least one first DMRS port number and a quantity N of DMRS CDM groups that correspond to the multi-antenna operation mode of the first terminal device, and the N DMRS CDM groups include the at least one first DMRS port number.

Based on the foregoing solution, the first terminal device determines the multi-antenna operation mode based on the fifth information, to resolve the problem in the existing technology that increased power consumption and a resource waste are caused because the first terminal device operates in the MU-MIMO mode by default.

In a possible implementation, the fifth information is carried in DCI.

Based on this possible implementation, the first terminal device directly obtains, based on the downlink control information, the operation mode indicated by the network device, and the first terminal device obtains, based on the fifth information, the operation mode indicated by the network device, the at least one first DMRS port number configured by the network device, and whether at least one second DMRS port number is allocated to the second terminal device. The first terminal device can conveniently switch the operation mode.

In a possible implementation, the N DMRS CDM groups include the at least one first DMRS port number and the at least one second DMRS port number. The at least one second DMRS port number is different from the at least one first DMRS port number. For example, the N DMRS CDM groups are composed of the at least one first DMRS port number and the at least one second DMRS port number; or the N DMRS CDM groups include the at least one first DMRS port number and the at least one second DMRS port number, and may further include another port number.

In a possible implementation, the fifth information indicates that the multi-antenna operation mode of the first terminal device is the MU-MIMO. The first terminal device determines, based on the fifth information, that the at least one second DMRS port number is allocated to a second terminal device. The second terminal device is at least one of remaining terminal devices other than the first terminal device in a communication system in which the first terminal device is located.

In a possible implementation, the fifth information indicates that the multi-antenna operation mode of the first terminal device is the SU-MIMO. The first terminal device determines, based on the fifth information, that the at least one second DMRS port number is not allocated to a second terminal device. The second terminal device is at least one of remaining terminal devices other than the first terminal device in a communication system in which the first terminal device is located.

Based on this possible implementation, when being applicable to the SU-MIMO mode, the first terminal device determines, based on the indication information of the network device, that the multi-antenna operation mode is the SU-MIMO. This resolves the problem in the existing technology that increased power consumption and a resource waste are caused because the first terminal device still operates in the MU-MIMO mode by default in a single-port transmission mode.

In a possible implementation, the first terminal device determines that the multi-antenna operation mode is the SU-MIMO. When the quantity N of DMRS CDM groups is greater than 1, the fifth information further indicates that a time-frequency resource corresponding to the at least one second DMRS port number is not used for data transmission or is used for data transmission between the first terminal device and the network device. Alternatively, if the fifth information does not indicate use of the time-frequency resource, the method further includes: The first terminal device may further receive sixth information, where the sixth information indicates that a time-frequency resource corresponding to the at least one second DMRS port number is not used for data transmission or is used for data transmission between the first terminal device and the network device.

Based on this possible implementation, if the second information or the third information indicates that the time-frequency resource corresponding to the at least one second DMRS port number is not used for data transmission, a DMRS of the first terminal device can obtain a power enhancement benefit. This helps improve channel estimation performance. If a transmit power of the network device remains unchanged, and no data is transmitted on the time-frequency resource corresponding to the at least one second DMRS port number, the network device sends the DMRS to the first terminal device in the transmit power. In this way, a signal-to-noise ratio of the DMRS received by the first terminal device can be improved, thereby improving channel estimation performance. If the second information or the third information indicates that the time-frequency resource corresponding to the at least one second DMRS port number is used for data transmission between the first terminal device and the network device, a resource waste is avoided.

In a possible implementation, a time domain length of data transmission between the first terminal device and the network device is greater than a length of two OFDM symbols. The data may be carried on a PDSCH. Optionally, the data transmission is a single transmission or one data transmission between the network device and the first terminal device.

Based on this possible implementation, when the time domain length of data transmission between the first terminal device and the network device is greater than the length of the two OFDM symbols, configuration information of the network device indicates the multi-antenna operation mode of the first terminal device and use of the time-frequency resource corresponding to the at least one second DMRS port number. In this case, the multi-antenna operation mode of the first terminal device may be the SU-MIMO or the MU-MIMO. When the time domain length of data transmission between the first terminal device and the network device is not greater than the length of the two OFDM symbols, because a quantity of OFDM symbols used for data transmission is small, in this case, the first terminal device may assume that the time-frequency resource corresponding to the at least one second DMRS port number is not used for data transmission, and only data between the network device and the first terminal device is transmitted on a given time-frequency resource. In this case, the multi-antenna operation mode of the first terminal device is the SU-MIMO. In this way, efficiency of data transmission that is between the first terminal device and the network device and that is in a small time domain length can be ensured.

In a possible implementation, the first terminal device sends seventh information to the network device, to indicate at least one of the following:
   an application scenario of the first terminal device;
   a type of the first terminal device; and
   capability information of the first terminal device.

Optionally, the application scenario of the first terminal device includes at least one of an industrial wireless sensor network (IWSN) and video surveillance. The type of the first terminal device includes a reduced capability (REDCAP) terminal device, for example, at least one of an industrial wireless sensor, a video surveillance camera, or a wearable device. The capability information of the first terminal device includes that the multi-antenna operation mode supported by the first terminal device is the SU-MIMO and/or the MU-MIMO.

Based on this possible implementation, the first terminal device reports information, so that the network device configures, based on the application scenario of the first terminal device, the type of the first terminal device, or the capability information of the first terminal device, information for indicating the multi-antenna operation mode. This resolves a problem in the existing technology that increased power consumption and a resource waste are caused because the first terminal device operates in the MU-MIMO mode by default and the operation mode of the first terminal device may not match an actually applicable operation mode of the first terminal device. It should be noted that, generally, an application scenario corresponds to a service type. Therefore, the network device may determine, based on the application scenario of the first terminal device, a multi-antenna operation mode indicated by the configuration information. If one or more application scenarios include service types applicable to different multi-antenna operation modes, the application scenario reported by the first terminal device is an application scenario corresponding to the service type. For example, if the application scenario such as the IWSN and/or video surveillance further includes a periodic service and an aperiodic service, the application scenario reported by the first terminal device is an IWSN and/or video surveillance corresponding to the periodic service, or the application scenario reported by the first terminal device is an IWSN and/or video surveillance corresponding to the aperiodic service.

In a possible implementation, the first terminal device is in a radio resource control connected state (RRC connected state).

According to a third aspect, the embodiments may provide a communication method. The method may be performed by a network device, or may be performed by a chip or an integrated circuit in a network device. The following provides descriptions by using an example in which the method is performed by the network device. The method includes: The network device sends first information to a first terminal device, where the first information indicates a first multi-antenna operation mode of the first terminal device. The network device sends second information to the first terminal device, where the second information indicates at least one first DMRS port number and a quantity N of DMRS CDM groups that correspond a second multi-antenna operation mode of the first terminal device, the N DMRS CDM groups include the at least one first DMRS port number, and N is a positive integer.

Based on the foregoing solution, the network device indicates the multi-antenna operation mode of the first terminal device by configuring the first information and the second information. This resolves the problem in the existing technology that increased power consumption and a resource waste are caused because the first terminal device operates in the MU-MIMO mode by default.

In a possible implementation, the first information is carried in higher layer signaling, where the higher layer signaling may be RRC signaling or MAC signaling. The second information is carried in physical layer signaling such as DCI.

Based on the optional manner, when the first terminal device executes a service through static or semi-static scheduling by the network device, and/or the first terminal device is used in a static or semi-static scenario, for example, a periodic service scenario in an industrial wireless sensor network (IWSN) and/or video surveillance, an operation manner of the first terminal device generally remains unchanged. The network device indicates the multi-antenna operation mode of the first terminal device by using higher layer signaling. When the first terminal device executes a service through dynamic scheduling by the network device, the first terminal device is used in a dynamic scenario, and/or the first terminal device is used in a scenario in which the first terminal device is paired with a terminal device in another dynamic scenario, for example, an aperiodic service scenario in an industrial wireless sensor network (IWSN) and/or video surveillance, the operation manner of the first terminal device may change frequently. The network device indicates the multi-antenna operation mode of the first terminal device by using physical layer signaling, to implement dynamic switching of the multi-antenna operation mode of the first terminal device. In another possible scenario, for example, in a scenario in which a static scenario or a semi-static scenario is combined with a dynamic scenario, or the scenarios frequently switch, the network device indicates the multi-antenna operation mode of the first terminal device by using higher layer signaling and physical layer signaling, so that the multi-antenna operation mode of the first terminal device can be flexibly configured.

For example, optionally, the first multi-antenna operation mode is configured for the first terminal device based on the first information. In this case, if the first multi-antenna operation mode is suitable for the first terminal device, and the network device configures the second information based on the first multi-antenna operation mode, the first terminal device operates in a first operation mode. If the first multi-antenna operation mode is unsuitable for the first terminal device, the network device may indicate, based on the second information, the second multi-antenna operation mode that is different from the first multi-antenna operation mode, and the first terminal device implements switching of the multi-antenna operation mode. Alternatively, after the first terminal device operates in the first multi-antenna operation mode for a period of time, the multi-antenna operation mode applicable to the first terminal device changes. In this case, the network device adjusts from configuring the second information based on the multi-antenna operation mode indicated by the first information to configuring the second information based on the multi-antenna operation mode applicable to the first terminal device, and the first terminal device switches the multi-antenna operation mode based on the second information.

In a possible implementation, the N DMRS CDM groups include the at least one first DMRS port number and at least one second DMRS port number. The at least one second DMRS port number is different from the at least one first DMRS port number. For example, the N DMRS CDM groups are composed of the at least one first DMRS port number and the at least one second DMRS port number; or the N DMRS CDM groups include the at least one first DMRS port number and the at least one second DMRS port number, and may further include another port number.

In a possible implementation, the first information indicates SU-MIMO, and the second information indicates MU-MIMO; or the first information indicates MU-MIMO, and the second information indicates MU-MIMO. In either of the two scenarios, the network device determines that the at least one second DMRS port number is allocated to the second terminal device. The second terminal device is at least one of remaining terminal devices other than the first terminal device in a communication system in which the first terminal device is located.

In a possible implementation, the first information indicates SU-MIMO, and the second information indicates the SU-MIMO; or the first information indicates MU-MIMO, and the second information indicates SU-MIMO. In either of the two scenarios, the network device determines that the at least one second DMRS port number is not allocated to a second terminal device. The second terminal device is at least one of remaining terminal devices other than the first terminal device in a communication system in which the first terminal device is located.

Based on this possible implementation, the first terminal device determines, based on the first information and second information sent by the network device, that the multi-antenna operation mode is the SU-MIMO. This resolves the problem in the existing technology that increased power consumption and a resource waste are caused because the first terminal device still operates in the MU-MIMO mode by default in a single-port transmission mode.

In a possible implementation, the network device determines that at least one second DMRS port number is not allocated to a second terminal device. When the quantity N of DMRS CDM groups is greater than 1, the second information further indicates that a time-frequency resource corresponding to the at least one second DMRS port number is not used for data transmission or is used for data transmission between the first terminal device and the network device. Alternatively, if the second information does not indicate use of the time-frequency resource, the method further includes: The network device may further send third information to the first terminal device, where the third information indicates that a time-frequency resource corresponding to the at least one second DMRS port number is not used for data transmission or is used for data transmission between the first terminal device and the network device.

Based on this possible implementation, if the second information or the third information indicates that the time-frequency resource corresponding to the at least one second DMRS port number is not used for data transmission, a DMRS of the first terminal device can obtain a power enhancement benefit. This helps improve channel estimation performance. If a transmit power of the network device remains unchanged, and no data is transmitted on the time-frequency resource corresponding to the at least one second DMRS port number, the network device sends the DMRS to the first terminal device in the transmit power. In this way, a signal-to-noise ratio of the DMRS received by the first terminal device can be improved, thereby improving channel estimation performance. If the second information or the third information indicates that the time-frequency resource corresponding to the at least one second DMRS port number is used for data transmission between the first terminal device and the network device, a resource waste is avoided.

In a possible implementation, a time domain length of data transmission between the first terminal device and the network device is greater than a length of two OFDM symbols. The data may be carried on a PDSCH. Optionally, the data transmission is a single transmission or one data transmission between the network device and the first terminal device.

Based on this possible implementation, when the time domain length of data transmission between the first terminal device and the network device is greater than the length of the two OFDM symbols, configuration information of the network device indicates the multi-antenna operation mode of the first terminal device and use of the time-frequency resource corresponding to the at least one second DMRS port number. In this case, the multi-antenna operation mode configured by the network device for the first terminal device may be the SU-MIMO or the MU-MIMO. When the time domain length of data transmission between the first terminal device and the network device is not greater than the length of the two OFDM symbols, because a quantity of OFDM symbols used for data transmission is small, in this case, the first terminal device may assume that the time-frequency resource corresponding to the at least one second DMRS port number is not used for data transmission, and only data between the network device and the first terminal device is transmitted on a given time-frequency resource. In this case, the multi-antenna operation mode configured by the network device for the first terminal device is the SU-MIMO. In this way, efficiency of data transmission that is between the first terminal device and the network device and that is in a small time domain length can be ensured.

In a possible implementation, the network device receives fourth information from the first terminal device, to indicate at least one of the following:

an application scenario of the first terminal device;
a type of the first terminal device; and
capability information of the first terminal device.

Optionally, the application scenario of the first terminal device includes at least one of an industrial wireless sensor network (IWSN) and video surveillance. The type of the first terminal device includes a reduced capability (REDCAP) terminal device, for example, at least one of an industrial wireless sensor, a video surveillance camera, or a wearable device. The capability information of the first terminal device includes that the multi-antenna operation mode supported by the first terminal device is the SU-MIMO and/or the MU-MIMO.

Based on this possible implementation, the network device configures, based on the application scenario of the first terminal device, the type of the first terminal device, or the capability information of the first terminal device, information for indicating the multi-antenna operation mode. This resolves a problem in the existing technology that increased power consumption and a resource waste are caused because the first terminal device operates in the MU-MIMO mode by default and the operation mode of the first terminal device may not match an actually applicable operation mode of the first terminal device. It should be noted that, generally, an application scenario corresponds to a service type. Therefore, the network device may determine, based on the application scenario of the first terminal device, a multi-antenna operation mode indicated by the configuration information. If one or more application scenarios include service types applicable to different multi-antenna operation modes, the application scenario reported by the first terminal device is an application scenario corresponding to the service type. For example, if the application scenario such as the IWSN and/or video surveillance further includes a periodic service and an aperiodic service, the application scenario reported by the first terminal device is an IWSN and/or video surveillance corresponding to the periodic service, or the application scenario reported by the first terminal device is an IWSN and/or video surveillance corresponding to the aperiodic service.

According to a fourth aspect, the embodiments may provide a communication method. The method may be performed by a network device, or may be performed by a chip or an integrated circuit in a network device. The following provides descriptions by using an example in which the method is performed by the network device. The method includes: The network device sends fifth information to a first terminal device, where the fifth information indicates that a multi-antenna operation mode of the first terminal device is SU-MIMO or MU-MIMO.

The fifth information further indicates at least one first DMRS port number and a quantity N of DMRS CDM groups that correspond to the multi-antenna operation mode of the first terminal device, the N DMRS CDM groups include the at least one first DMRS port number, and N is a positive integer.

Based on the foregoing solution, the network device indicates the multi-antenna operation mode of the first terminal device by configuring the fifth information. This resolves the problem in the existing technology that increased power consumption and a resource waste are caused because the first terminal device operates in the MU-MIMO mode by default.

In a possible implementation, the fifth information is carried in DCI.

Based on this possible implementation, the network device indicates the multi-antenna operation mode of the first terminal device based on the downlink control information, and the network device indicates, based on the fifth information, the multi-antenna operation mode of the first terminal device, the at least one first DMRS port number corresponding to the first terminal device, and whether at least one second DMRS port number is allocated to a second terminal device. The network device can conveniently indicate switching of the multi-antenna operation mode of the first terminal device.

In a possible implementation, the N DMRS CDM groups include the at least one first DMRS port number and the at least one second DMRS port number. The at least one second DMRS port number is different from the at least one first DMRS port number. For example, the N DMRS CDM groups are composed of the at least one first DMRS port number and the at least one second DMRS port number; or the N DMRS CDM groups include the at least one first DMRS port number and the at least one second DMRS port number, and may further include another port number.

In a possible implementation, the fifth information indicates that the multi-antenna operation mode of the first terminal device is the MU-MIMO. The network device determines that at least one second DMRS port number is allocated to a second terminal device. The second terminal device is at least one of remaining terminal devices other than the first terminal device in a communication system in which the first terminal device is located.

In a possible implementation, the fifth information indicates that the multi-antenna operation mode of the first terminal device is the SU-MIMO. The network device determines that at least one second DMRS port number is not allocated to the second terminal device. The second terminal device is at least one of remaining terminal devices other than the first terminal device in a communication system in which the first terminal device is located.

Based on this possible implementation, the network device configures the fifth information to indicate that the multi-antenna operation mode of the first terminal device is the SU-MIMO. Accordingly, the first terminal device determines, based on the fifth information, that the multi-antenna operation mode is the SU-MIMO. This resolves the problem in the existing technology that increased power consumption and a resource waste are caused because the first terminal device still operates in the MU-MIMO mode by default in a single-port transmission mode.

In a possible implementation, the network device determines that at least one second DMRS port number is not allocated to a second terminal device. When the quantity N of DMRS CDM groups is greater than 1, the fifth information further indicates that a time-frequency resource corresponding to the at least one second DMRS port number is not used for data transmission or is used for data transmission between the first terminal device and the network device. Alternatively, if the fifth information does not indicate use of the time-frequency resource, the method further includes: The network device may further send sixth information to the first terminal device, where the sixth information indicates that a time-frequency resource corresponding to the at least one second DMRS port number is not used for data transmission or is used for data transmission between the first terminal device and the network device.

Based on this possible implementation, if the second information or the third information indicates that the time-frequency resource corresponding to the at least one second DMRS port number is not used for data transmission, a DMRS of the first terminal device can obtain a power enhancement benefit. This helps improve channel estimation performance. If a transmit power of the network device remains unchanged, and no data is transmitted on the time-frequency resource corresponding to the at least one second DMRS port number, the network device sends the DMRS to the first terminal device in the transmit power. In this way, a signal-to-noise ratio of the DMRS received by the first terminal device can be improved, thereby improving channel estimation performance. If the second information or the third information indicates that the time-frequency resource corresponding to the at least one second DMRS port number is used for data transmission between the first terminal device and the network device, a resource waste is avoided.

In a possible implementation, a time domain length of data transmission between the first terminal device and the network device is greater than a length of two OFDM symbols. The data may be carried on a PDSCH. Optionally, the data transmission is a single transmission or one data transmission between the network device and the first terminal device.

Based on this possible implementation, when the time domain length of data transmission between the first terminal device and the network device is greater than the length of the two OFDM symbols, configuration information of the network device indicates the multi-antenna operation mode of the first terminal device and use of the time-frequency resource corresponding to the at least one second DMRS port number. In this case, the multi-antenna operation mode configured by the network device for the first terminal device may be the SU-MIMO or the MU-MIMO. When the time domain length of data transmission between the first terminal device and the network device is not greater than the length of the two OFDM symbols, because a quantity of OFDM symbols used for data transmission is small, in this case, the first terminal device may assume that the time-frequency resource corresponding to the at least one second DMRS port number is not used for data transmission, and only data between the network device and the first terminal device is transmitted on a given time-frequency resource. In this case, the multi-antenna operation mode configured by the network device for the first terminal device is the SU-MIMO. In this way, efficiency of data transmission that is between the first terminal device and the network device and that is in a small time domain length can be ensured.

In a possible implementation, the network device receives seventh information from the first terminal device, to indicate at least one of the following:

an application scenario of the first terminal device;
a type of the first terminal device; and
capability information of the first terminal device.

Optionally, the application scenario of the first terminal device includes at least one of an industrial wireless sensor network (IWSN) and video surveillance. The type of the first terminal device includes a reduced capability (REDCAP) terminal device, for example, at least one of an industrial wireless sensor, a video surveillance camera, or a wearable device. The capability information of the first terminal device includes that the multi-antenna operation mode supported by the first terminal device is the SU-MIMO and/or the MU-MIMO.

Based on this possible implementation, the network device configures, based on the application scenario of the first terminal device, the type of the first terminal device, or the capability information of the first terminal device, information for indicating the multi-antenna operation mode. This resolves a problem in the existing technology that increased power consumption and a resource waste are caused because the first terminal device operates in the MU-MIMO mode by default and the operation mode of the first terminal device may not match an actually applicable operation mode of the first terminal device. It should be noted that, generally, an application scenario corresponds to a service type. Therefore, the network device may determine, based on the application scenario of the first terminal device, a multi-antenna operation mode indicated by the configuration information. If one or more application scenarios include service types applicable to different multi-antenna operation modes, the application scenario reported by the first terminal device is an application scenario corresponding to the service type. For example, if the application scenario such as the IWSN and/or video surveillance further includes a periodic service and an aperiodic service, the application scenario reported by the first terminal device is an IWSN and/or video surveillance corresponding to the periodic service, or the application scenario reported by the first terminal device is an IWSN and/or video surveillance corresponding to the aperiodic service.

According to a fifth aspect, the embodiments may provide a communication apparatus. For beneficial effects, refer to descriptions in the first aspect or the second aspect. Details are not described herein again. The communication apparatus may be the first terminal device in the foregoing method embodiments or may be a chip or an integrated circuit disposed in the first terminal device. The apparatus includes at least one processor and an interface circuit, and optionally, further includes a memory. The memory is configured to store a computer program or instructions, and the processor is coupled to the memory and the interface circuit. The interface circuit is configured to provide input or output of instructions and/or data for the at least one processor. When the at least one processor executes the instructions, the apparatus is enabled to implement functions of the first terminal device. In an optional implementation, the at least one processor is configured to perform a function of determining the multi-antenna operation mode in the foregoing method. The interface circuit is configured to perform a function of receiving the first information and the second information by the first terminal device from the network device, or the interface circuit is configured to perform a function of receiving the fifth information by the first terminal device from the network device. Optionally, the interface circuit is further configured to perform a function of sending the fourth information by the first terminal to the network device or perform a function of sending the seventh information by the first terminal device to the network device.

According to a sixth aspect, the embodiments may provide a communication apparatus. For beneficial effects, refer to descriptions in the third aspect or the fourth aspect. Details are not described herein again. The communication apparatus may be the network device in the foregoing method embodiments or may be a chip or an integrated circuit disposed in the network device. The apparatus includes at least one processor and an interface circuit, and optionally, further includes a memory. The memory is configured to store a computer program or instructions, and the processor is coupled to the memory and the interface circuit. The interface circuit is configured to provide input or output of instructions and/or data for the at least one processor. When the at least one processor executes the instructions, the apparatus is enabled to implement functions of the network device. In an optional implementation, the at least one processor is configured to perform a function of configuring the multi-antenna operation mode in the foregoing method. The interface circuit is configured to perform a function of sending the first information and the second information by the network device to the first terminal device, or the interface circuit is configured to perform a function of sending the fifth information by the network device to the first terminal device. Optionally, the interface circuit is further configured to perform a function of receiving, by the network device, the fourth information sent by the first terminal device, or the interface circuit is configured to perform a function of receiving, by the network device, the seventh information sent by the first terminal device.

According to a seventh aspect, the embodiments may further provide a communication apparatus. The communication apparatus has functions of implementing behavior in the method instances in the first aspect or the third aspect. For beneficial effects, refer to descriptions in the first aspect or the second aspect. Details are not described herein again. The function may be implemented by hardware or may be implemented by hardware executing corresponding software. The hardware or the software includes one or more modules corresponding to the foregoing function.

In an optional implementation, the communication apparatus includes: a receiving module, configured to receive first information and second information from a network device, where the first information indicates a first multi-antenna operation mode of a first terminal device, and the second information indicates a second multi-antenna operation mode of the first terminal device; or configured to receive fifth information from a network device, where the fifth information indicates a multi-antenna operation mode of the first terminal device; a processing module, configured to determine that the multi-antenna operation mode of the first terminal device is SU-MIMO or MU-MIMO; and a sending module, configured to send fourth information to the network device, where the fourth information indicates an application scenario of the first terminal device, a type of the first terminal device, and/or capability information of the first terminal device; or configured to send seventh information to the network device, where the seventh information indicates an application scenario of the first terminal device, a type of the first terminal device, and/or capability information of the first terminal device.

According to an eighth aspect, the embodiments may further provide a communication apparatus. The communication apparatus has functions of implementing behavior in the method instances in the third aspect or the fourth aspect. For beneficial effects, refer to descriptions in the third aspect or the fourth aspect. Details are not described herein again. The function may be implemented by hardware or may be implemented by hardware executing corresponding software. The hardware or the software includes one or more modules corresponding to the foregoing function.

In an optional implementation, the communication apparatus includes: a sending module, configured to send first information and second information to a first terminal device, where the first information indicates a first multi-antenna operation mode of the first terminal device, and the second information indicates a second multi-antenna operation mode of the first terminal device; or configured to send fifth information to a first terminal device, where the fifth information indicates a multi-antenna operation mode of the first terminal device; a processing module, configured to determine that the multi-antenna operation mode of the first terminal device indicated by configuration information is SU-MIMO or MU-MIMO; and a receiving module, configured to receive fourth information from the first terminal device, where the fourth information indicates an application scenario of the first terminal device, a type of the first terminal device, and/or capability information of the first terminal device; or configured to receive seventh information from the first terminal device, where the seventh information indicates an application scenario of the first terminal device, a type of the first terminal device, and/or capability information of the first terminal device.

According to a ninth aspect, a computer program product is provided. The computer program product includes computer program code. When the computer program code is run by at least one processor, the method performed by the first terminal device in the foregoing aspects is performed.

According to a tenth aspect, a computer program product is provided. The computer program product includes computer program code. When the computer program code is run by at least one processor, the method performed by the network device in the foregoing aspects is performed.

According to an eleventh aspect, the embodiments may provide a chip system. The chip system includes at least one processor and an interface circuit. The interface circuit is configured to provide input or output of instructions and/or data for the at least one processor. When the at least one processor executes the instructions, the chip system is enabled to implement functions of the first terminal device in the methods in the foregoing aspects. The chip system may further include a memory, configured to store program instructions and/or data. The chip system may include a chip or may include a chip and another discrete component.

According to a twelfth aspect, the embodiments may provide a chip system. The chip system includes at least one processor and an interface circuit. The interface circuit is configured to provide input or output of instructions and/or data for the at least one processor. When the at least one processor executes the instructions, the chip system is enabled to implement functions of the network device in the methods in the foregoing aspects. The chip system may further include a memory, configured to store program instructions and/or data. The chip system may include a chip or may include a chip and another discrete component.

According to a thirteenth aspect, a non-transitory computer-readable storage medium is provided and is configured to store a computer program. The computer program includes instructions used to perform the method in any one of the first aspect or the second aspect or the possible implementations of the first aspect or the second aspect.

According to a fourteenth aspect, a non-transitory computer-readable storage medium is provided and is configured to store a computer program. The computer program includes instructions used to perform the method in any one of the third aspect or the fourth aspect or the possible implementations of the third aspect or the fourth aspect.

According to a fifteenth aspect, a communication system is provided. The communication system includes the network device and the terminal device in any one of the foregoing aspects.

Compared with the existing technology, the multi-antenna operation mode of the first terminal device can be flexibly configured. For example, when there may be a large quantity of terminal devices in a communication system in which the first terminal device is located, a MU-MIMO mode may be configured to ensure a user data transmission rate and improve system transmission efficiency. When there may be a small quantity of terminal devices in the communication system in which the first terminal device is located, a SU-MIMO mode may be configured to ensure performance of data transmission between the first terminal device and the network device, and reduce complexity of the first terminal device.

BRIEF DESCRIPTION OF THE DRAWINGS

The following describes the embodiments in more detail with reference to the accompanying drawings.

DETAILED DESCRIPTION OF THE EMBODIMENTS

Figure 1:
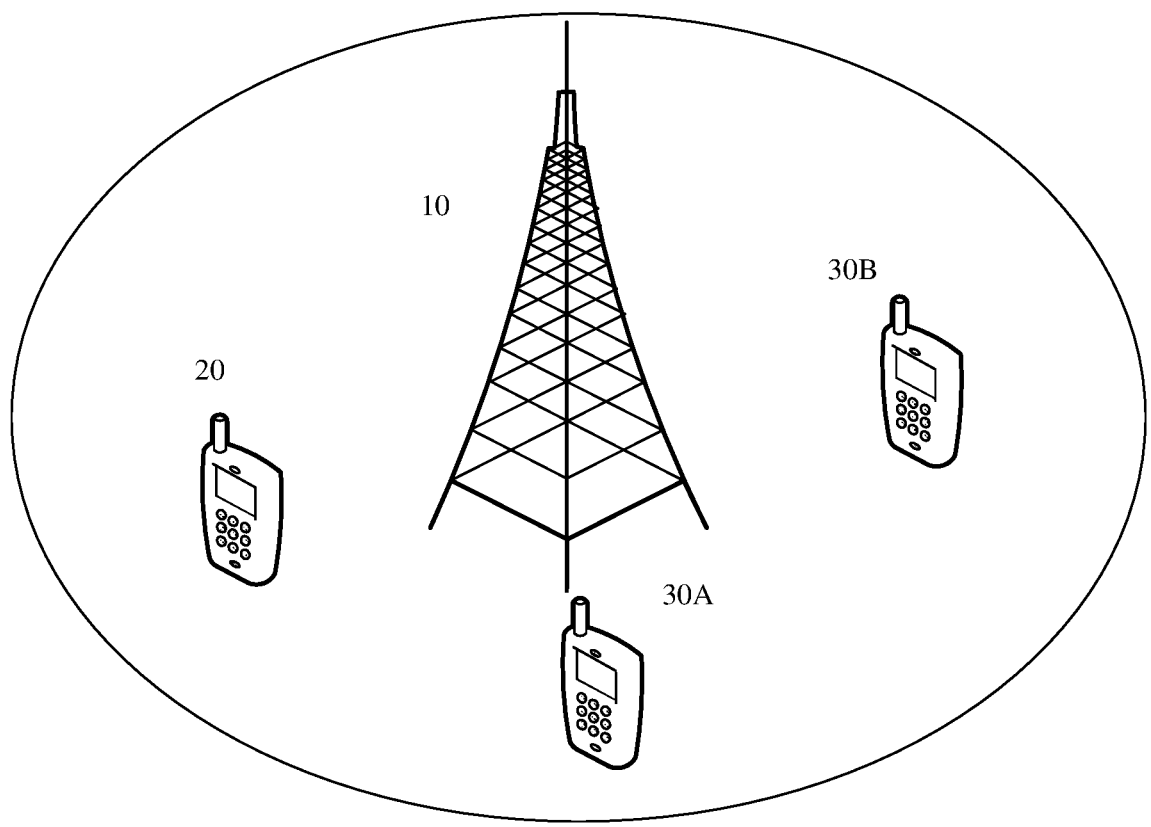
FIG. 1 is a schematic diagram of a communication scenario according to an embodiment.

In the embodiments and accompanying drawings, the terms "first", "second", "third" and the like are intended to distinguish different objects but do not limit a particular sequence. In addition, in the embodiments, the word "exemplary" or "for example" is used to represent giving an example, an illustration, or a description. Any embodiment described as an "example" or "for example" in should not be explained as being more preferred or having more advantages than another embodiment. Using the word "exemplary" or "example" or the like is intended to present a relative concept.

The following describes the embodiments with reference to the accompanying drawings. It is clear that the described embodiments are merely some but not all of embodiments. All other embodiments obtained by a person of ordinary skill in the art without creative efforts shall fall within the scope of the embodiments.

To facilitate understanding, related concepts in the embodiments are described herein.

1. A single-user multiple-input multiple-output (SU-MIMO) mode means that a network device sends a plurality of data flows to a single terminal device on a given time-frequency resource.

2. A multi-user multiple-input multiple-output (MU-MIMO) mode means that the network device sends a plurality of data flows to a plurality of terminal devices on a given time-frequency resource, and each terminal device corresponds to one or more data flows.

3. DCI format 1_1 and DCI format 1_0 are two DCI formats of DCI related to transmission of a physical downlink shared channel (PDSCH).

The DCI in the DCI format 1_1 may indicate port information of a DMRS, and the port information includes a quantity of demodulation reference signal (DMRS) code division multiplexing (CDM) groups without data and a DMRS port number. A quantity of front-loaded DMRS symbols configured by the network device is 1 or 2, and the quantity of front-loaded DMRS symbols is a quantity of OFDM symbols occupied by the DMRS. In addition, DMRS types configured by the network device include a first-type DMRS and a second-type DMRS. Quantities of time-frequency resource elements corresponding to a DMRS port corresponding to the first-type DMRS and a DMRS port corresponding to a second-type DMRS are different. Each DMRS CDM group includes a plurality of DMRS ports. A case in the existing technology may be expressed as follows:

When the quantity of front-loaded DMRS symbols is 1 and the DMRS type is a first type, OFDM symbols occupied by the DMRS support two DMRS CDM groups. A time-frequency resource block corresponding to each DMRS CDM group includes six time-frequency resource elements, each DMRS CDM group includes two DMRS ports, and each DMRS port number corresponds to three time-frequency resource elements.

When the quantity of front-loaded DMRS symbols is 2 and the DMRS type is a first type, OFDM symbols occupied by the DMRS support two DMRS CDM groups. A time-frequency resource block corresponding to each DMRS CDM group includes 12 time-frequency resource elements, each DMRS CDM group includes four DMRS ports, and each DMRS port number corresponds to three time-frequency resource elements.

When the quantity of front-loaded DMRS symbols is 1 and the DMRS type is a second type, OFDM symbols occupied by the DMRS support three DMRS CDM groups. A time-frequency resource block corresponding to each DMRS CDM group includes four time-frequency resource elements, each DMRS CDM group includes two DMRS ports, and each DMRS port number corresponds to two time-frequency resource elements.

When the quantity of front-loaded DMRS symbols is 2 and the DMRS type is a second type, OFDM symbols occupied by the DMRS support three DMRS CDM groups. A time-frequency resource block corresponding to each DMRS CDM group includes eight time-frequency resource elements, each DMRS CDM group includes four DMRS ports, and each DMRS port number corresponds to two time-frequency resource elements.

In an NR communication system, a maximum of two codewords can be transmitted when one data transmission is performed. Table 1 is a state table of DMRS port numbers indicated by the DCI in the DCI format 1_1 when data transmission is performed in the NR communication system, in a case of configuring a codeword for transmission, the quantity of front-loaded DMRS symbols being 1, and the first-type DMRS by the network device.

TABLE 1

Single codeword usage:
Codeword 0 is used and codeword 1 is not used

| Information value | Quantity of DMRS CDM groups without data | DMRS port |
| --- | --- | --- |
| 0 | 1 | 0 |
| 1 | 1 | 1 |
| 2 | 1 | 0 and 1 |
| 3 | 2 | 0 |
| 4 | 2 | 1 |
| 5 | 2 | 2 |
| 6 | 2 | 3 |
| 7 | 2 | 0 and 1 |
| 8 | 2 | 2 and 3 |
| 9 | 2 | 0 to 2 |
| 10 | 2 | 0 to 3 |
| 11 | 2 | 0 and 2 |
| 12 to 15 | Reserved state | Reserved state |

In the DCI in the DCI format 1_1, there is a 4-bit indication field indicating DMRS port value information, which corresponds to 16 information values. Information values 0 to 11 indicate DMRS port information. Information values 12 to 15 indicate a reserved state and do not indicate any DMRS port information. Each DMRS CDM group may include two DMRS port numbers, so that N DMRS CDM groups may include 2N DMRS port numbers. If the port number indicated in the state table is referred to as a first DMRS port number, a relationship between the quantity N of DMRS CDM groups and the first DMRS port number is one of the following four cases:

If the quantity N of DMRS CDM groups is 1, there is one first DMRS port number.

If the quantity N of DMRS CDM groups is 1, there may be a plurality of first DMRS port numbers.

If the quantity N of DMRS CDM groups is greater than 1, there is one first DMRS port number.

If the quantity N of DMRS CDM groups is greater than 1, there may be a plurality of first DMRS port numbers.

The DCI in the DCI format 1_0 does not explicitly indicate a DMRS CDM group and a DMRS port number. When duration of scheduling a PDSCH by the DCI in the DCI format 1_0 is two OFDM symbols, the terminal device receives the DCI in the DCI format 1_0, and assumes that the quantity of DMRS CDM groups is 1. When duration of scheduling a PDSCH by the DCI in the DCI format 1_0 exceeds two OFDM symbols, the terminal device receives the DCI in the DCI format 1_0, and assumes that the quantity of DMRS CDM groups is 2. For single-port transmission, the network device needs to configure only one DMRS CDM group and one DMRS port. However, in this determining manner, when duration of scheduling a PDSCH received by the terminal device exceeds two OFDM symbols, the quantity of DMRS CDM groups determined by the terminal device is still 2. Although there is no assumption for the MU-MIMO, the two DMRS CDM groups need to correspond to two time-frequency resource blocks. This not only causes a resource waste, but also causes a problem in rate matching of data transmission between the network device and the terminal device.

4. Reduced capacity (REDCAP) terminal device: In a new radio (NR) communication system, some application scenarios need to support the REDCAP terminal device. The REDCAP terminal device may have a narrower bandwidth, a smaller quantity of antenna ports, a lower transmission rate, and/or the like. In addition, the REDCAP terminal device has a longer battery life, lower processing complexity, and/or lower costs.

The embodiments may be applied to various communication systems, for example, may be applied to a fifth generation (5G) communications system, a future evolved system, or a plurality of converged communication systems. The embodiments may be used in a plurality of application scenarios of the foregoing communication systems, for example, industrial wireless sensor network (IWSN) and video surveillance. The embodiments may support a plurality of terminal device types, for example, the REDCAP terminal device, including an industrial wireless sensor, a video surveillance camera, or a wearable device (smart watch).

In the descriptions, terms such as "first" and "second" are only for distinction and description but cannot be understood as indicating or implying relative importance, or as indicating or implying an order. "At least one" means one or more, and "a plurality of" means two or more. The term "and/or" describes an association relationship between associated objects and may indicate three relationships. For example, A and/or B may indicate the following cases: only A exists, both A and B exist, and only B exists, where A and B may be singular or plural. The character "/" generally indicates an "or" relationship between the associated objects. "At least one of the following items (pieces)" or a similar expression thereof refers to any combination of these items, including any combination of singular items (pieces) or plural items (pieces). For example, at least one item (piece) of a, b, or c may represent a, b, c, a and b, a and c, b and c, or a and b and c, where a, b, and c may be singular pieces or plural pieces.

To make a person skilled in the art understand the embodiments better, the following describes the embodiments with reference to the accompanying drawings. It is clear that the described embodiments are merely some but not all of the embodiments. All other embodiments obtained by a person of ordinary skill in the art without creative efforts shall fall within the scope of the embodiments.

The embodiments may be applied to a communication system shown in FIG. 1. The system includes at least one network device 10 and at least one communication device 20. A communication device 30 is at least one of other communication devices other than the communication device 20 in the communication system.

The network device 10 may be an access network device. The access network device may also be referred to as a radio access network (RAN) device and may be a device that provides a wireless communication function for the communication device. The access network device includes, for example, but is not limited to, a next generation NodeB (gNB), an evolved NodeB (eNB), a baseband unit (BBU), a transmission reception point (TRP), or a transmitting point (TP) in 5G, a base station in a future mobile communication system, or an access point in a Wi-Fi system.

An application scenario of the network device 10 includes, but is not limited to, an application scenario of an industrial wireless sensor network (IWSN), video surveillance, and/or a wearable device. A service executed by the network device 10 includes, but is not limited to, a periodic service or an aperiodic service in an IWSN and/or a video surveillance scenario, enhanced mobile bandwidth (eMBB), ultra-reliable low-latency communication (URLLC), massive machine-type communications (mMTC), or the like.

The communication device 20 provides a voice and/or data connection service for a user, for example, may be a terminal device, or may be referred to as user equipment (UE), a user terminal (UT), a mobile terminal (MT), a mobile station (MS), or the like, and may communicate with one or more core networks through a radio access network (RAN). For example, the terminal device may be a mobile phone (or also referred to as a "cellular" phone) or a computer that has a mobile terminal. For example, the user equipment may further be a portable, pocket-size, handheld, computer-integrated or vehicle-mounted mobile apparatus, which exchanges voice and/or data with the radio access network.

An application scenario of the communication device 20 includes, but is not limited to, an application scenario of an industrial wireless sensor network (IWSN), video surveillance, and/or a wearable device. A type of the communication device 20 includes, but is not limited to, the wearable device. A service executed by the communication device 20 includes, but is not limited to, a periodic service or an aperiodic service in an IWSN and/or a video surveillance scenario, enhanced mobile bandwidth (eMBB), ultra-reliable low-latency communication (URLLC), massive machine-type communications (mMTC), or the like.

Figure 2:
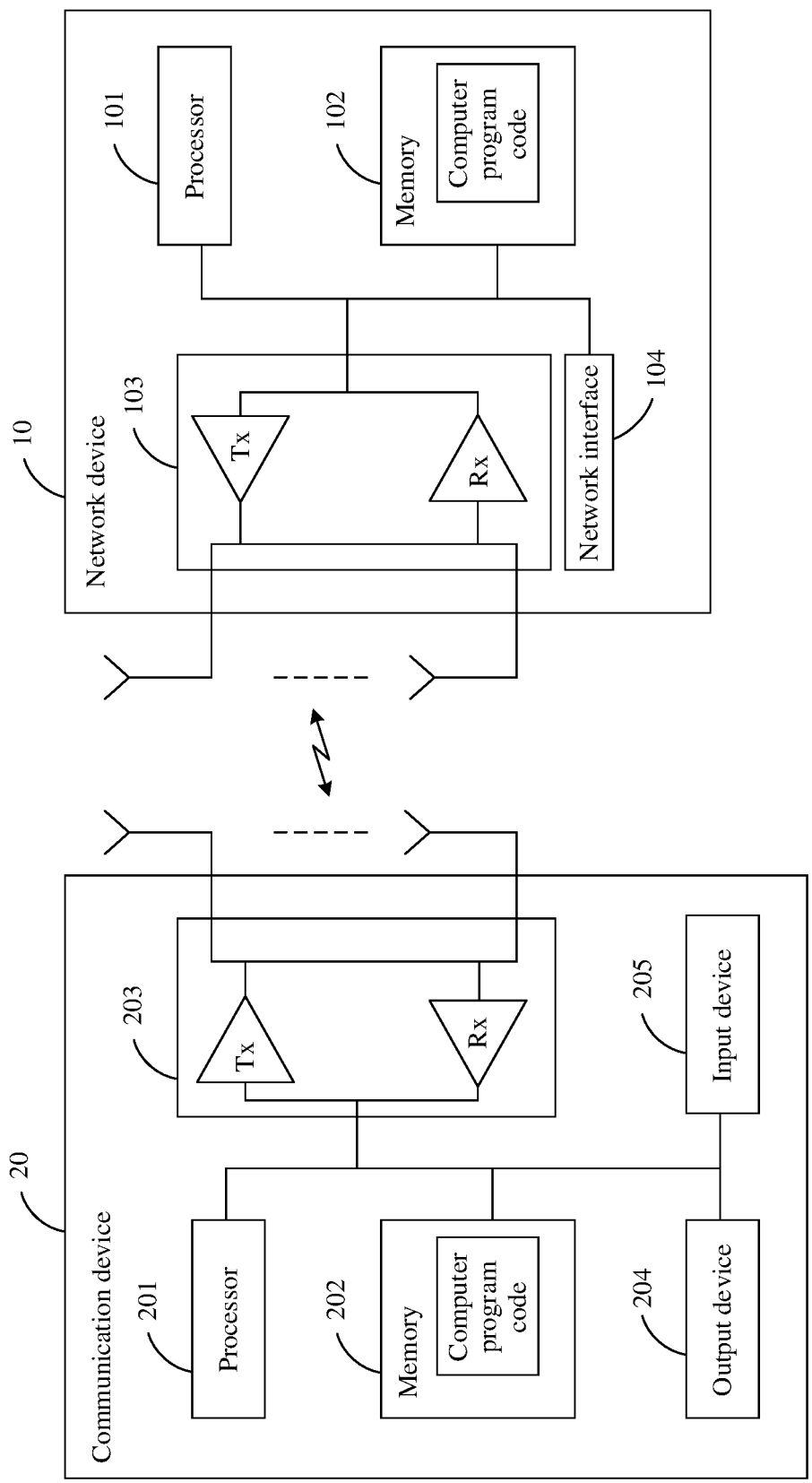
FIG. 2 is a schematic diagram of hardware structures of a network device and a communication device according to an embodiment.

FIG. 2 is a schematic diagram of hardware structures of a network device and a communication device according to an embodiment.

The network device 10 includes at least one processor 101, at least one memory 102, at least one transceiver 103, and at least one network interface 104. The processor 101, the memory 102, the transceiver 103, and the network interface 104 are connected through a bus. The network interface 104 is connected to a core network device over a link (for example, an S1 interface), or is connected to a network interface of another access network device over a wired or wireless link (for example, an X2 interface) (not shown in the figure). This is not limited in this embodiment.

The processor 101 may be a general-purpose central processing unit (CPU), a microprocessor, an application-specific integrated circuit (ASIC), or one or more integrated circuits configured to control program execution. The processor 201 may alternatively include a plurality of CPUs, and the processor 201 may be a single-core (single-CPU) processor or a multi-core (multi-CPU) processor. The processor herein may be one or more devices, circuits, or processing cores configured to process data (for example, computer program instructions).

The memory 102 may be a read-only memory (ROM) or another type of static storage device that can store static information and instructions, or a random access memory (RAM) or another type of dynamic storage device that can store information and instructions; or may be an electrically erasable programmable read-only memory (EEPROM), a compact disc read-only memory (CD-ROM), or another compact disc storage, an optical disc storage (including a compact disc, a laser disc, an optical disc, a digital versatile optical disc, a Blu-ray disc, or the like), a disk storage medium or another disk storage device, or any other medium that can be used to carry or store expected program code in a form of an instruction or a data structure and that can be accessed by a computer. However, the memory 102 is not limited herein. The memory 102 may exist independently and may be connected to the processor 101 through the bus. Alternatively, the memory 102 may be integrated with the processor 101. The memory 102 is configured to store application program code and the processor 101 is configured to execute the computer program code stored in the memory 102, to implement the multi-antenna operation mode indication method provided in the embodiments.

The transceiver 103 may use any apparatus of a transceiver type and may be configured to communicate with another device or a communications network such as the Ethernet, a radio access network (RAN), or a wireless local area network (WLAN). The transceiver 203 includes a transmitter Tx and a receiver Rx.

The communication device 20 includes at least one processor 201, at least one memory 202, and at least one transceiver 203. Optionally, the communication device 20 may further include an output device 204 and an input device 205. The processor 201, the memory 202, and the transceiver 203 are connected through a bus. In addition, for related descriptions of the processor 201, the memory 202, and the transceiver 203, refer to descriptions of the processor 101, the memory 102, and the transceiver 103 in the network device 10. Details are not described herein again.

The output device 204 may communicate with the processor 201 and may display information in a plurality of manners. For example, the output device 204 may be a liquid crystal display (LCD), a light emitting diode (LED) display device, a cathode ray tube (CRT) display device, a projector, or the like. The input device 205 communicates with the processor 201, and may receive user input in a plurality of manners. For example, the input device 205 may be a mouse, a keyboard, a touchscreen device, or a sensing device.

The embodiments may provide a multi-antenna operation mode indication method. The following provides descriptions by using an example in which a communication apparatus is a terminal device. A network device sends configuration information to a first terminal device, where the configuration information indicates a multi-antenna operation mode of the first terminal device, and the first terminal device determines the multi-antenna operation mode based on indication information configured by the network device, to resolve a problem that increased power consumption and a resource waste are caused because the terminal device operates in a MU-MIMO mode by default.

Figure 3:
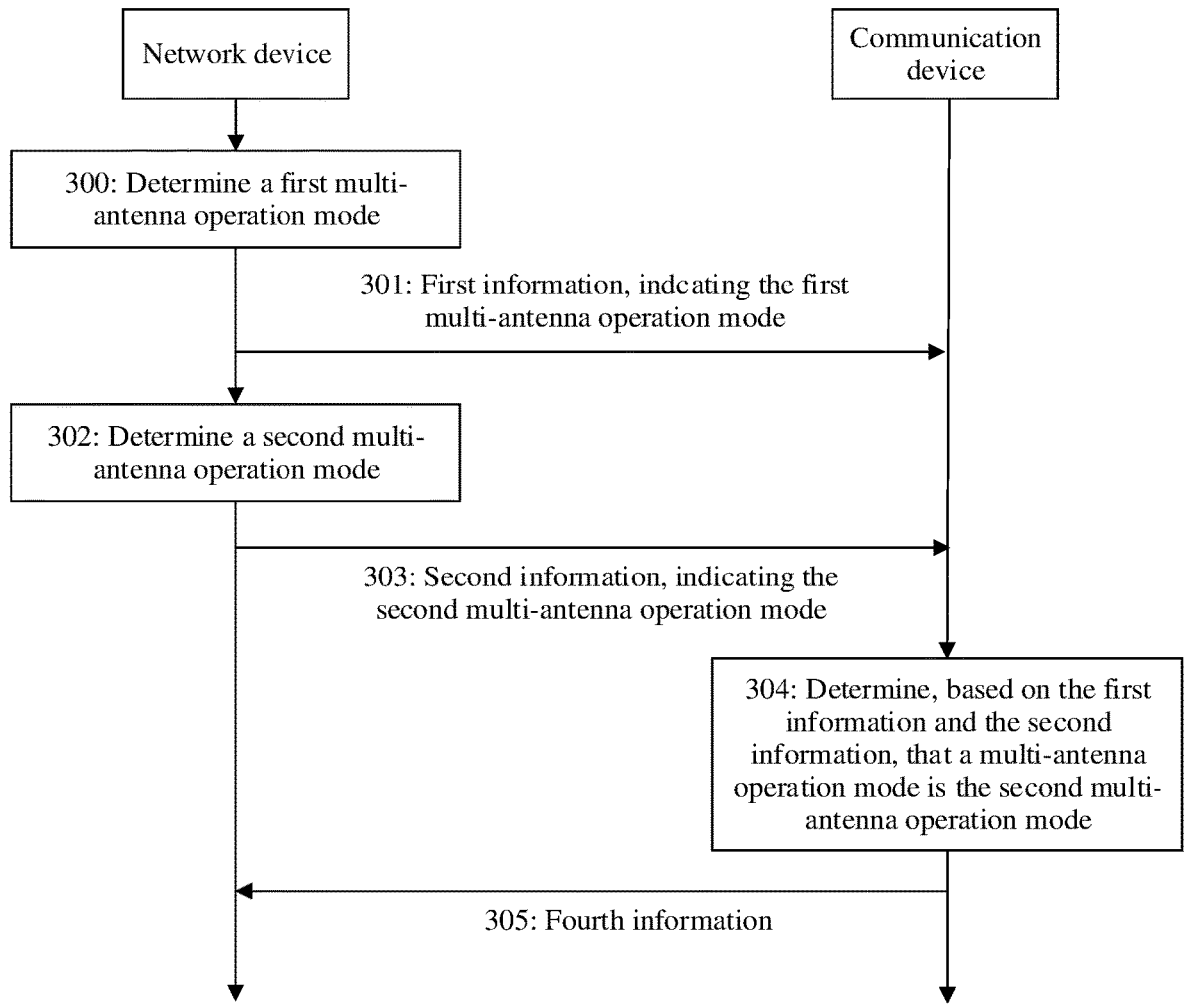
FIG. 3 is a schematic flowchart of a multi-antenna operation mode indication method according to an embodiment.

FIG. 3 is a schematic flowchart of a multi-antenna operation mode indication method. The method includes steps 300 to 306.

300: A network device determines a first multi-antenna operation mode.

The network device may determine the first multi-antenna operation mode based on an application scenario of a first terminal device, a device type of the first terminal device, and/or capability information of the first terminal device; or the network device determines the first multi-antenna operation mode based on a predefinition or a preconfiguration.

301: The network device sends first information to the first terminal device, and correspondingly, the first terminal device receives the first information from the network device. The first information indicates the first multi-antenna operation mode of the first terminal device.

The first information may be carried in radio resource control (RRC) signaling or media access control (MAC) signaling.

The first information may indicate that the first multi-antenna operation mode of the first terminal device is SU-MIMO. The first terminal device receives the first information and determines that the multi-antenna operation mode is the SU-MIMO. When the network device needs to configure the multi-antenna operation mode of the first terminal device to be the SU-MIMO, the first information may be used for indication. Otherwise, the multi-antenna operation mode of the first terminal device is MU-MIMO. When the first multi-antenna operation mode is not indicated by using the RRC signaling or the MAC signaling, the terminal device may operate in the MU-MIMO mode by default.

The first information may indicate that the first multi-antenna operation mode of the first terminal device is SU-MIMO or MU-MIMO. In other words, there may be no default multi-antenna operation mode, and the first terminal device may determine the first multi-antenna operation mode based on the indication of the first information.

302: The network device determines a second multi-antenna operation mode.

The network device determines the second multi-antenna operation mode based on the application scenario of the first terminal device, the device type of the first terminal device, and/or the capability information of the first terminal device; or the network device determines the second multi-antenna operation mode based on a predefinition or a preconfiguration.

303: The network device sends second information to the first terminal device, and correspondingly, the first terminal device receives the second information from the network device. The second information indicates that the multi-antenna operation mode of the first terminal device is the SU-MIMO or the MU-MIMO. Further, the second information further indicates at least one first demodulation reference signal DMRS port number and a quantity N of demodulation reference signal DMRS code division multiplexing CDM groups that correspond to a second multi-antenna operation mode of the first terminal device. The N DMRS CDM groups include the at least one first DMRS port number, and N is a positive integer.

The second information may indicate that the second multi-antenna operation mode of the first terminal device is the SU-MIMO or the MU-MIMO. Optionally, the second information is carried in downlink control information, and a format of the downlink control information may be DCI format 1_1.

The N DMRS CDM groups include the at least one first DMRS port number and at least one second DMRS port number. The at least one second DMRS port number is different from the at least one first DMRS port number. For example, the N DMRS CDM groups are composed of the at least one first DMRS port number and the at least one second DMRS port number; or the N DMRS CDM groups include the at least one first DMRS port number and the at least one second DMRS port number, and may further include another port number.

In an example, the second information may be carried by using an indication field in the downlink control information. Optionally, the indication field may include 4 bits. The second information indicates different information to the first terminal device based on different values of the indication field.

There may be a correspondence between a value of the second information and the multi-antenna operation mode. The correspondence is predefined or configured. In an example, the correspondence is represented in a table below. However, a representation form of the correspondence is not limited.

A possible correspondence may be shown in Table 2. The second information is carried in a 4-bit indication field, which corresponds to 16 information values. Information values 0 to 11 indicate the MU-MIMO operation mode to the first terminal device, which is relatively compatible with the existing technology. Information values 12 and 13 indicate the SU-MIMO operation mode to the first terminal device. Information values 14 and 15 indicate a reserved state, and temporarily indicate no multi-antenna operation mode.

TABLE 2

Single codeword usage:
Codeword 0 is used and codeword 1 is not used

| Information value | Quantity of DMRS CDM groups | DMRS port | SU/MU indication |
|---|---|---|---|
| 0 | 1 | 0 | MU-MIMO |
| 1 | 1 | 1 | MU-MIMO |
| 2 | 1 | 0 and 1 | MU-MIMO |
| 3 | 2 | 0 | MU-MIMO |
| 4 | 2 | 1 | MU-MIMO |
| 5 | 2 | 2 | MU-MIMO |
| 6 | 2 | 3 | MU-MIMO |
| 7 | 2 | 0 and 1 | MU-MIMO |
| 8 | 2 | 2 and 3 | MU-MIMO |
| 9 | 2 | 0 to 2 | MU-MIMO |
| 10 | 2 | 0 to 3 | MU-MIMO |
| 11 | 2 | 0 and 2 | MU-MIMO |
| 12 | 1 | 0 | SU-MIMO |
| 13 | 2 | 0 and 1 | SU-MIMO |
| 14 and 15 | Reserved state | Reserved state | Reserved state |

In an example, when the information value 12 in Table 2 indicates the SU-MIMO operation mode, a quantity of DMRS CDM groups indicated by the information value 12 may be 1, and a DMRS port number indicated by the information value 12 may be 0. When the information value 13 indicates the SU-MIMO operation mode, a quantity of DMRS CDM groups indicated by the information value 13 may be 2, and DMRS port numbers indicated by the information value 13 may be 0 and 1. A single-antenna port terminal device may transmit data to the network device through one DMRS port, and a dual-antenna port terminal device may transmit data to the network device through two DMRS ports. Further, optionally, the information value 12 may indicate the SU-MIMO mode of the single-antenna port terminal device, and the information value 13 may indicate the SU-MIMO mode of the dual-antenna port terminal device.

A correspondence between the quantity N of DMRS CDM groups and the DMRS port number shown in Table 2 is merely an example. This is not limited.

304: The first terminal device determines that the multi-antenna operation mode is the second multi-antenna operation mode.

During communication, a DMRS is a signal type known by the network device and the terminal device and is used for channel estimation. It may be understood that the DMRS is invalid data. However, on a PDSCH, in addition to the DMRS, there is further data that can be learned of by the terminal device only after the terminal device demodulates information sent by the network device. The data may be understood as valid data. In other words, the PDSCH includes the DMRS and the valid data.

when operating in the MU-MIMO, the first terminal device may receive the downlink control information from the network device and may determine that at least one second DMRS port number is allocated to a second terminal device. In this case, there is a DMRS in a time-frequency resource corresponding to the at least one second DMRS port number. When demodulating the valid data on the PDSCH sent by the network device, the first terminal device needs to process the DMRS corresponding to the second terminal device and data transmitted through at least one second DMRS port corresponding to the second terminal device as interference signals. In this case, power consumption and complexity of the first terminal device are high. When operating in the SU-MIMO, the first terminal device receives the downlink control information from the network device and determines that at least one second DMRS port number is not allocated to a second terminal device. In this case, there is no DMRS in a time-frequency resource corresponding to the at least one second DMRS port number. Therefore, there is no step in which the first terminal device processes, in the MU-MIMO mode, the DMRS corresponding to the second terminal device and data transmitted through at least one second DMRS port corresponding to the second terminal device as interference signals. In this case, both power consumption and complexity of the first terminal device are reduced.

Example 1: The first multi-antenna operation mode indicated by the first information is the SU-MIMO, and the second multi-antenna operation mode indicated by the second information is the MU-MIMO. After the first terminal device receives the first information and the second information, the multi-antenna operation mode of the first terminal device is the MU-MIMO, and the at least one second DMRS port number is allocated to the second terminal device.

Example 2: The first multi-antenna operation mode indicated by the first information is the SU-MIMO, and the second multi-antenna operation mode indicated by the second information is also the SU-MIMO. After the first terminal device receives the first information and the second information, the multi-antenna operation mode of the first terminal device is the SU-MIMO, and the at least one second DMRS port number is not allocated to the second terminal device.

Example 3: The first multi-antenna operation mode indicated by the first information is the MU-MIMO, and the second multi-antenna operation mode indicated by the second information is also the MU-MIMO. After the first terminal device receives the first information and the second information, the multi-antenna operation mode of the first terminal device is the MU-MIMO, and the at least one second DMRS port number is allocated to the second terminal device.

Example 4: The first multi-antenna operation mode indicated by the first information is the MU-MIMO, and the second multi-antenna operation mode indicated by the second information is the SU-MIMO. After the first terminal device receives the first information and the second information, the multi-antenna operation mode of the first terminal device is the SU-MIMO, and the at least one second DMRS port number is not allocated to the second terminal device.

Further, optionally, the network device sends eighth information to the first terminal device.

The eighth information indicates a third multi-antenna operation mode of the first terminal device. The eighth information further indicates at least one first demodulation reference signal DMRS port number and a quantity N1 of demodulation reference signal DMRS code division multiplexing CDM groups that correspond to the third multi-antenna operation mode. The N1 DMRS CDM groups include the at least one first DMRS port number, and N1 is a positive integer.

The eighth information may indicate that the third multi-antenna operation mode of the first terminal device is the SU-MIMO or the MU-MIMO. Optionally, the eighth information is carried in downlink control information, and a format of the downlink control information may be DCI format 1_1.

The N1 DMRS CDM groups include the at least one first DMRS port number and at least one second DMRS port number. The at least one first DMRS port number is different from the at least one second DMRS port number. For example, the N1 DMRS CDM groups are composed of the at least one first DMRS port number and the at least one second DMRS port number; or the N1 DMRS CDM groups include the at least one first DMRS port number and the at least one second DMRS port number, and may further include another port number. It should be noted that a manner of allocating a DMRS port number to the DMRS CDM group in the eighth information may be the same as or different from a manner of allocating a DMRS port number to the DMRS CDM group in the second information. The at least one first DMRS port number in the eighth information may be the same as or different from the at least one first DMRS port number in the second information. The at least one second DMRS port number in the eighth information may be the same as or different from the at least one second DMRS port number in the second information.

Correspondingly, the first terminal device receives the eighth information, and determines that the multi-antenna operation mode is the third multi-antenna operation mode.

The following four possible cases may be included.

In a first case, both the third multi-antenna operation mode and the second multi-antenna operation mode are the MU-MIMO. After receiving the eighth information, the first terminal device determines that the multi-antenna operation mode is the third multi-antenna operation mode, and the first terminal device maintains the MU-MIMO operation mode.

In a second case, both the third multi-antenna operation mode and the second multi-antenna operation mode are the SU-MIMO. After receiving the eighth information, the first terminal device determines that the multi-antenna operation mode is the third multi-antenna operation mode, and the first terminal device maintains the SU-MIMO operation mode.

In a third case, the second multi-antenna operation mode is the SU-MIMO, and the third multi-antenna operation mode is the MU-MIMO. After receiving the eighth information, the first terminal device determines to switch the multi-antenna operation mode from the SU-MIMO to the MU-MIMO.

In a fourth case, the second multi-antenna operation mode is the MU-MIMO, and the third multi-antenna operation mode is the SU-MIMO. After receiving the eighth information, the first terminal device determines to switch the multi-antenna operation mode from the MU-MIMO to the SU-MIMO.

Based on the descriptions of the four cases, when the first terminal device determines the second multi-antenna operation mode based on the first information and the second information, the first terminal device operates in the second multi-antenna operation mode. After this, if the multi-antenna operation mode applicable to the first terminal device changes, and the operation mode needs to be adjusted, the eighth information may be selected to switch the multi-antenna operation mode of the first terminal device.

When the first terminal device determines that the multi-antenna operation mode is the SU-MIMO, and the quantity N and/or N1 of DMRS CDM groups are/is greater than 1, time-frequency resource blocks corresponding to the N and/or N1 DMRS CDM groups are also greater than 1. The at least one second DMRS port number is not allocated to the second terminal device, and the time-frequency resource corresponding to the at least one second DMRS port number is no longer used for data transmission between the second terminal device and the network device.

Optionally, when the first terminal device determines that the multi-antenna operation mode is the SU-MIMO, and the quantity N and/or N1 of DMRS CDM groups are/is greater than 1, a use manner of the time-frequency resource corresponding to the at least one second DMRS port number is further indicated.

In a first manner, different information values of the 4-bit indication field in the DCI in the DCI format 1_1 indicate a use manner of the time-frequency resource corresponding to the at least one second DMRS port number. Optionally, when one or more information values indicate the SU-MIMO mode, and the quantity N and/or N1 of DMRS CDM groups are/is greater than 1, the one or more information values may further indicate the use manner of the time-frequency resource corresponding to at least one second DMRS port number.

For example, in Table 3, when the information value 12 indicates the SU-MIMO mode, and the quantity N and/or N1 of DMRS CDM groups are/is greater than 1, the time-frequency resource corresponding to the at least one second DMRS port number is not used for data transmission, that is, SU-MIMO-1. When the information value 13 indicates the SU-MIMO mode, and the quantity N and/or N1 of DMRS CDM groups are/is greater than 1, the time-frequency resource corresponding to the at least one second DMRS port number is used for data transmission between the first terminal device and the network device, that is, SU-MIMO-2.

TABLE 3

Single codeword usage:
Codeword 0 is used and codeword 1 is not used

| Information value | Quantity of DMRS CDM groups without data | DMRS port | SU/MU indication |
|---|---|---|---|
| 0 | 1 | 0 | MU-MIMO |
| 1 | 1 | 1 | MU-MIMO |
| 2 | 1 | 0 and 1 | MU-MIMO |
| 3 | 2 | 0 | MU-MIMO |
| 4 | 2 | 1 | MU-MIMO |
| 5 | 2 | 2 | MU-MIMO |
| 6 | 2 | 3 | MU-MIMO |
| 7 | 2 | 0 and 1 | MU-MIMO |
| 8 | 2 | 2 and 3 | MU-MIMO |
| 9 | 2 | 0 to 2 | MU-MIMO |
| 10 | 2 | 0 to 3 | MU-MIMO |
| 11 | 2 | 0 and 2 | MU-MIMO |
| 12 | 2 | 0 and 1 | SU-MIMO-1 |
| 13 | 2 | 0 and 1 | SU-MIMO-2 |
| 14 and 15 | Reserved state | Reserved state | Reserved state |

When the information value 12 in Table 3 indicates the SU-MIMO-1 operation mode, a quantity of DMRS CDM groups indicated by the information value 12 may be 2, and DMRS port numbers indicated by the information value 12 may be 0 and 1. For example, when the information value 12 indicates that the dual-antenna port terminal device operates in the SU-MIMO mode, the time-frequency resource corresponding to the at least one second DMRS port number is not used for data transmission. For another example, when the information value 13 indicates the SU-MIMO-2 operation mode, a quantity of DMRS CDM groups indicated by the information value 13 may be 2, and DMRS port numbers indicated by the information value 13 may be 0 and 1. For still another example, when the information value 13 indicates that the dual-antenna port terminal device operates in the SU-MIMO mode, the time-frequency resource corresponding to the at least one second DMRS port number is used for data transmission between the first terminal device and the network device.

A correspondence between the quantity N of DMRS CDM groups and the DMRS port number shown in Table 3 is merely an example. This is not limited.

In a second manner, an indication field other than the 4-bit indication field in the DCI in the DCI format 1_1 indicates a use manner of the time-frequency resource corresponding to the at least one second DMRS port number. For example, 1 bit other than the 4-bit indication field is used as the third information, and the 1 bit corresponds to two information values. Optionally, an information value 0 of the third information indicates that the time-frequency resource corresponding to the at least one second DMRS port number is not used for data transmission, and an information value 1 of the third information indicates that the time-frequency resource corresponding to the at least one second DMRS port is used for data transmission between the first terminal device and the network device.

In a third manner, higher layer signaling configured by the network device indicates a use manner of the time-frequency resource corresponding to the at least one second DMRS port number. For example, the network device sends the third information to the first terminal device, where the third information indicates that the time-frequency resource corresponding to the at least one second DMRS port number is not used for data transmission or is used for data transmission between the first terminal device and the network device.

Optionally, the method further includes: 305: The first terminal device reports fourth information to the network device. Correspondingly, the network device receives the fourth information.

In an example, the fourth information indicates an application scenario of the first terminal. Optionally, the application scenario indicated by the fourth information includes at least one of an industrial wireless sensor network (IWSN) and video surveillance.

In another example, the fourth information indicates a device type of the first terminal device. Optionally, the device type indicated by the fourth information includes a reduced capability (REDCAP) terminal device, for example, at least one of an industrial wireless sensor, a video surveillance camera, or a wearable device.

In another example, the fourth information indicates capability information of the first terminal device. The capability information of the terminal device indicated by the fourth information may include that multi-antenna operation modes supported by the first terminal device include the SU-MIMO and/or the MU-MIMO.

In addition, information indicated by the fourth information may alternatively be any combination of the information in the foregoing plurality of examples.

Optionally, the method further includes: 306: The network device configures a corresponding operation mode based on the fourth information.

The network device may perform step 300 based on the fourth information. Further, optionally, the network device may alternatively perform step 302 based on the first information.

In step 301, the first information may indicate that the first multi-antenna operation mode of the first terminal device is the SU-MIMO. The first terminal device receives the first information, and determines that the multi-antenna operation mode is the SU-MIMO. When the network device needs to configure the first terminal device to be the SU-MIMO, the first information may be used for indication. Otherwise, the multi-antenna operation mode of the first terminal device is the MU-MIMO. When the first multi-antenna operation mode is not indicated by using the RRC signaling or the MAC signaling, the terminal device may operate in the MU-MIMO mode by default. In this case, a possible example is as follows: The network device does not indicate the first multi-antenna operation mode by using the RRC signaling or the MAC signaling, and the terminal device operates in the MU-MIMO mode by default. Further, the network device sends the second information to the terminal device. The terminal device receives the second information from the network device, and determines, based on the second information, that the multi-antenna operation mode is the SU-MIMO or the MU-MIMO.

The network device may send the second information to the first terminal device, where the second multi-antenna operation mode indicated by the second information is the MU-MIMO. The first terminal device determines that the at least one second DMRS port number is allocated to the second terminal device, and determines that the multi-antenna operation mode is the MU-MIMO.

The network device may send the second information to the first terminal device, where the second multi-antenna operation mode indicated by the second information is the SU-MIMO. The first terminal device determines that the at least one second DMRS port number is not allocated to the second terminal device, and determines that the multi-antenna operation mode is the SU-MIMO.

Further, when the second information indicates the SU-MIMO mode and the quantity N of DMRS CDM groups is greater than 1, the second information may further indicate a use manner of the time-frequency resource corresponding to the at least one second DMRS port number. For an indication method, refer to related descriptions in step 304.

Figure 4:
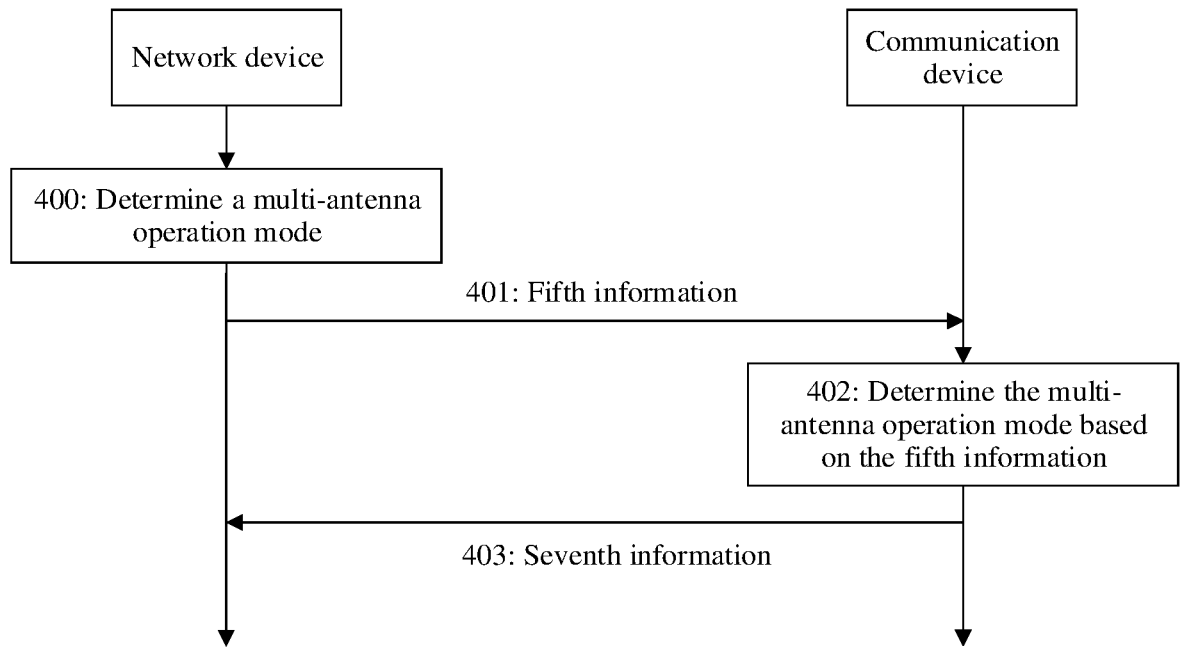
FIG. 4 is a schematic flowchart of another multi-antenna operation mode indication method according to an embodiment.

FIG. 4 is a schematic flowchart of another multi-antenna operation mode indication method. The method includes steps 400 to 404.

400: A network device determines a multi-antenna operation mode of a first terminal device.

The network device determines the multi-antenna operation mode of the first terminal device based on an application scenario of the first terminal device, a device type of the first terminal device, and/or capability information of the first terminal device; or the network device determines the multi-antenna operation mode of the first terminal device based on a predefinition or a preconfiguration.

401: The network device sends fifth information, where the fifth information indicates that the multi-antenna operation mode of the first terminal device is SU-MIMO or MU-MIMO. Further, the fifth information further indicates at least one first demodulation reference signal DMRS port number and a quantity N of demodulation reference signal DMRS code division multiplexing CDM groups that correspond to the multi-antenna operation mode of the first terminal device. The N DMRS CDM groups include the at least one first DMRS port number, and N is a positive integer.

Optionally, the fifth information is carried in downlink control information, and a format of the downlink control information may be DCI format 1_1.

The N DMRS CDM groups include the at least one first DMRS port number and at least one second DMRS port number. The at least one first DMRS port number is different from the at least one second DMRS port number. For example, the N DMRS CDM groups are composed of the at least one first DMRS port number and the at least one second DMRS port number; or the N DMRS CDM groups include the at least one first DMRS port number and the at least one second DMRS port number and may further include another port number.

In an example, the fifth information may be carried by using an indication field in the downlink control information. Optionally, the indication field may include 4 bits. The fifth information indicates different information to the first terminal device based on different values of the indication field.

There may be a correspondence between a value of the fifth information and the multi-antenna operation mode. The correspondence is predefined or configured. Optionally, the correspondence may be represented in a table manner. For the correspondence between the value and the multi-antenna operation mode, refer to related descriptions in the embodiment in FIG. 3. Details are not described herein again.

402: The first terminal device determines, based on the fifth information, that the multi-antenna operation mode is the SU-MIMO or the MU-MIMO.

During communication, a DMRS is a signal type known by the network device and the terminal device and is used for channel estimation. It may be understood that the DMRS is invalid data. However, on a PDSCH, in addition to the DMRS, there is further data that can be learned by the terminal device only after the terminal device demodulates information sent by the network device. The data may be understood as valid data. In other words, the PDSCH includes the DMRS and the valid data.

When operating in the MU-MIMO, the first terminal device may receive the downlink control information from the network device and may determine that at least one second DMRS port number is allocated to a second terminal device. In this case, there is a DMRS in a time-frequency resource corresponding to the at least one second DMRS port number. When demodulating the valid data on the PDSCH sent by the network device, the first terminal device needs to process the DMRS corresponding to the second terminal device and data transmitted through at least one second DMRS port corresponding to the second terminal device as interference signals. In this case, power consumption and complexity of the first terminal device are high. When operating in the SU-MIMO, the first terminal device receives the downlink control information from the network device, and determines that the at least one second DMRS port number is not allocated to the second terminal device. In this case, there is no DMRS in the time-frequency resource corresponding to the at least one second DMRS port number. Therefore, there is no step in which the first terminal device processes, in the MU-MIMO mode, the DMRS corresponding to the second terminal device and the data transmitted through the at least one second DMRS port corresponding to the second terminal device as the interference signals. In this case, both power consumption and complexity of the first terminal device are reduced.

In an example, the fifth information indicates that the multi-antenna operation mode of the first terminal device is the MU-MIMO. The first terminal device receives the fifth information, determines that the second DMRS port number is allocated to the second terminal device, and determines that the multi-antenna operation mode is the MU-MIMO.

In another example, the fifth information indicates that the multi-antenna operation mode of the first terminal device is the SU-MIMO. The first terminal device receives the fifth information, and determines that the second DMRS port number is not allocated to the second terminal device.

When the first terminal device determines that the multi-antenna operation mode is the SU-MIMO, and the quantity N of DMRS CDM groups is greater than 1, time-frequency resource blocks corresponding to the N DMRS CDM groups are also greater than 1. The at least one second DMRS port number is not allocated to the second terminal device, and the time-frequency resource corresponding to the at least one second DMRS port number is no longer used for data transmission between the second terminal device and the network device.

When the first terminal device determines that the multi-antenna operation mode is the SU-MIMO, and the quantity N of DMRS CDM groups is greater than 1, optionally, a use manner of the time-frequency resource corresponding to the at least one second DMRS port number is further indicated.

In a first manner, the fifth information indicates use of the time-frequency resource corresponding to the at least one second DMRS port number. For an indication method, refer to related descriptions in the embodiment shown in FIG. 3. Details are not described herein again.

In a second manner, an indication field other than the 4-bit information in the DCI in the DCI format 1_1 indicates a use manner of the time-frequency resource corresponding to the at least one DMRS port number. For example, one bit other than the 4-bit indication field is used as sixth information. The one bit corresponds to two information values. Optionally, an information value 0 of the sixth information indicates that the time-frequency resource corresponding to the at least one second DMRS port number is not used for data transmission. An information value 1 of the sixth information indicates that the time-frequency resource corresponding to the at least one second DMRS port is used for data transmission between the first terminal device and the network device.

In a third manner, higher layer signaling configured by the network device indicates a use manner of the time-frequency resource corresponding to the at least one second DMRS port number. For example, the network device sends sixth information to the first terminal device, where the sixth information indicates that the time-frequency resource corresponding to the at least one second DMRS port number is not used for data transmission or is used for data transmission between the first terminal device and the network device.

Optionally, the method further includes: 403: The first terminal device reports seventh information to the network device. Correspondingly, the network device receives the seventh information.

In an example, the seventh information indicates an application scenario of the first terminal device. Optionally, the application scenario indicated by the seventh information includes at least one of an industrial wireless sensor network (IWSN) and video surveillance.

In another example, the seventh information indicates a device type of the first terminal device. Optionally, the device type of the first terminal device indicated by the seventh information includes a reduced capability (RED-CAP) terminal device, for example, at least one of an industrial wireless sensor, a video surveillance camera, or a wearable device. In another example, the seventh information indicates capability information of the first terminal device. The capability information of the terminal device indicated by the seventh information includes that the multi-antenna operation mode supported by the first terminal device is the SU-MIMO and/or the MU-MIMO.

In addition, information indicated by the seventh information may alternatively be any combination of the information in the foregoing plurality of examples.

Optionally, the method further includes: 404: The network device configures a corresponding multi-antenna operation mode based on the seventh information.

The network device may perform, based on the seventh information, the step of determining the multi-antenna operation mode indicated by the fifth information in the step 400.

The foregoing describes, from the perspective of interaction between the communication device and the network device, the embodiments. It can be understood that, to implement the foregoing functions, the communication device and the network device include a corresponding hardware structure and/or software module for implementing each function. A person skilled in the art should easily be aware that, in combination with units and algorithm steps of the examples described in embodiments, the embodiments may be implemented by hardware or a combination of hardware and computer software. Whether a function is performed by hardware or hardware driven by computer software depends on particular applications. A person skilled in the art may use different methods to implement the described functions, but it should not be considered that the implementation goes beyond the scope of the embodiments.

In an embodiment, the communication device and the network device may be divided according to the foregoing method examples. For example, modules or units may be obtained through division based on functions, or two or more functions may be integrated into one processing module. The foregoing integrated module may be implemented in a form of hardware, or may be implemented in a form of a software module or unit. In the embodiments, module or unit division is an example, and is merely a logical function division. In actual implementation, another division manner may be used.

Figure 5:
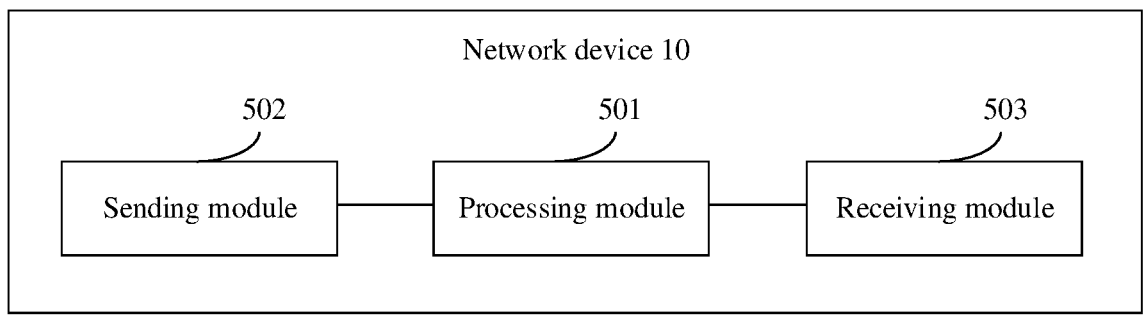
FIG. 5 is a schematic diagram of a structure of a communication apparatus according to an embodiment.

For example, when functional modules are obtained through division based on functions, FIG. 5 shows a possible schematic diagram of a structure of the communication apparatus in the foregoing embodiments. As shown in FIG. 5, the communication apparatus 500 includes a processing module 501, a sending module 502, and a receiving module 503. The communication apparatus may be a network device, or may be a chip system or an integrated circuit in the network device.

When the communication apparatus 500 is configured to implement the functions of the network device in the method embodiment in FIG. 3, the processing module 501 is configured to support the network device in performing functions of determining a first multi-antenna operation mode of a first terminal device and determining a second multi-antenna operation mode of the first terminal device, for example, step 300 in FIG. 3 and step 302 in FIG. 3. The sending module 502 is configured to support the network device in performing a function of sending first information and second information to a terminal device, for example, step 301 and step 303 in FIG. 3, and/or another process used for the technology described in the embodiments. The receiving module 503 is configured to support the network device in performing a function of receiving fourth information sent by the first terminal device, for example, step 305 in FIG. 3, and/or another process used for the technology described in the embodiments.

When the communication apparatus 500 is configured to implement the functions of the network device in the method embodiment in FIG. 4, the processing module 501 is configured to support the network device in performing a function of determining a multi-antenna operation mode of a first terminal device, for example, step 400 in FIG. 4. The sending module 502 is configured to support the network device in performing a function of sending fifth information to a terminal device, for example, step 401 in FIG. 4, and/or another process used for the technology described in the embodiments. The receiving module 503 is configured to support the network device in performing a function of receiving seventh information sent by the first terminal device, for example, step 403 in FIG. 4, and/or another process used for the technology described in the embodiments.

Figure 6:
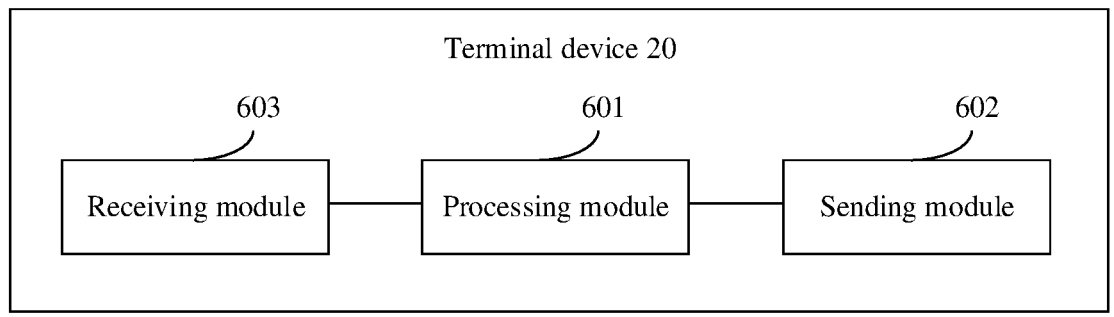
FIG. 6 is a schematic diagram of a structure of a communication apparatus according to an embodiment.

For example, when functional modules are obtained through division based on functions, FIG. 6 shows a possible schematic diagram of a structure of the communication apparatus in the foregoing embodiments. As shown in FIG. 6, the communication apparatus 600 includes a processing module 601, a sending module 602, and a receiving module 603. The communication apparatus may be a terminal device, or may be a chip system or an integrated circuit in the terminal device.

When the communication apparatus 600 is configured to implement the functions of the first terminal device in the method embodiment in FIG. 3, the processing module 601 is configured to support the first terminal device in performing a function of determining a multi-antenna operation mode, for example, step 304 in FIG. 3. The receiving module 603 is configured to support the first terminal device in performing a function of receiving first information and second information sent by a network device, for example, step 301 and step 303 in FIG. 3, and/or another process used for the technology described in the embodiments. The sending module 602 is configured to support the first terminal device in performing a function of sending fourth information to the network device, for example, step 305 in FIG. 3, and/or another process used for the technology described in the embodiments.

When the communication apparatus 600 is configured to implement the functions of the first terminal device in the method embodiment in FIG. 4, the processing module 601 is configured to support the first terminal device in performing a function of determining a multi-antenna operation mode, for example, step 402 in FIG. 4. The receiving module 603 is configured to support the first terminal device in performing a function of receiving fifth information sent by the network device, for example, step 401 in FIG. 4, and/or another process used for the technology described in the embodiments. The sending module 602 is configured to support the first terminal device in performing a function of sending seventh information to the network device, for example, step 403 in FIG. 4, and/or another process used for the technology described in the embodiments.

In this embodiment, the apparatus is presented in a form in which functional modules are obtained through division based on corresponding functions, or the apparatus is presented in a form in which the functional modules are divided in an integrated manner. The "module" herein may include an application-specific integrated circuit (ASIC), a circuit, a processor and a memory that execute one or more software programs or firmware programs, an integrated logic circuit, or another component that can provide the foregoing functions. In a simple embodiment, a person skilled in the art can figure out that the network device may be implemented by the network device shown in FIG. 2. For example, the sending module 502 in FIG. 5 may be implemented by the communication interface 103 in FIG. 2, and the processing module 501 may be implemented by the processor 101 in FIG. 2. This is not limited in any manner in this embodiment.

The embodiments may further provide a non-transitory computer-readable storage medium. The non-transitory computer-readable storage medium stores instructions. When the non-transitory computer-readable storage medium is executed on a computer, functions of the network device and the terminal device in the methods are implemented.

Optionally, the embodiments may provide a chip system configured to support implementation of a multi-antenna operation mode indication method, for example, the multi-antenna operation mode indication methods shown in FIG. 3 and FIG. 4. The chip system includes at least one processor and an interface circuit. The interface circuit is configured to provide input or output of instructions and/or data for the at least one processor. When the at least one processor executes the instructions, the chip system is enabled to implement functions of the network device or the terminal device in the multi-antenna operation mode indication method. The chip system may further include a memory. The memory is configured to store program instructions and data that are necessary for the network device. Alternatively, the memory may not be in the chip system. The chip system may include a chip or may include a chip and another discrete component. This is not limited in this embodiment.

Figure 7:
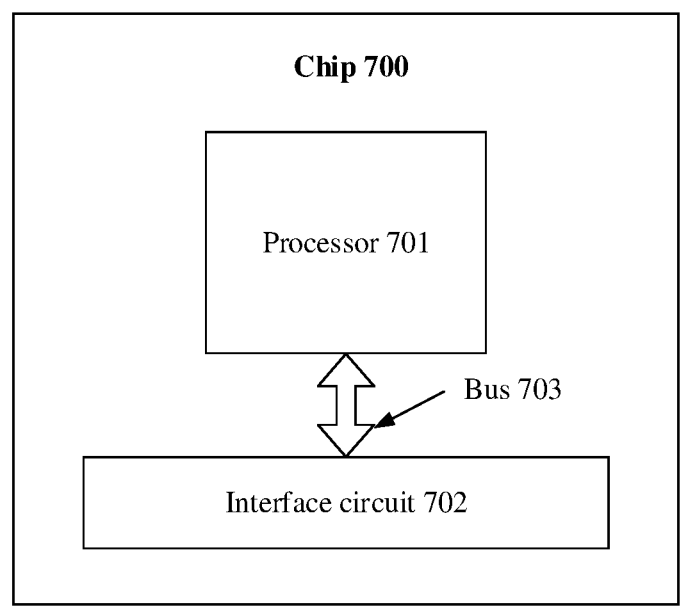
FIG. 7 is a schematic diagram of a chip according to an embodiment.

FIG. 7 shows an example of a chip system according to the embodiments. The chip system 700 includes a processor 701 and an interface circuit 702. Optionally, the processor 701 and the interface circuit 702 may be connected through a bus 703.

The embodiments may provide a communication system, including the foregoing one or more network devices and the foregoing one or more communication devices.

It should be finally noted that the foregoing descriptions are merely implementations, but are not intended as limiting. Any variation or replacement shall fall within the scope of the embodiments.

What is claimed is:

1. A communication method, comprising:
   receiving first information from a network device, wherein the first information indicates a first multi-antenna operation mode of a first terminal device, and the first information is carried in radio resource control (RRC) signaling or media access control (MAC) signaling;
   receiving second information from the network device, wherein the second information indicates at least one first demodulation reference signal (DMRS) port number and a quantity N of demodulation reference signal DMRS code division multiplexing (CDM) groups that correspond to a second multi-antenna operation mode of the first terminal device, the N DMRS CDM groups comprise the at least one first DMRS port number, and N is a positive integer, wherein the second information is carried in downlink control information (DCI);

determining that a multi-antenna operation mode of the first terminal device is the second multi-antenna operation mode;

sending third information to the network device, wherein the third information indicates at least an application scenario or a device type of the first terminal device;

receiving fourth information from the network device, wherein the fourth information indicates a third multi-antenna operation mode of the first terminal device based on the third information; and determining that a multi-antenna operation mode of the first terminal device is the third multi-antenna operation mode.

2. The communication method according to claim 1, wherein the N DMRS CDM groups further comprise at least one second DMRS port number, and the at least one second DMRS port number is different from the at least one first DMRS port number.

3. The communication method according to claim 2, wherein
the first multi-antenna operation mode is multi-user multiple-input multiple-output (MU-MIMO), and the second multi-antenna operation mode is MU-MIMO; or
the first multi-antenna operation mode is single-user multiple-input multiple-output (SU-MIMO), and the second multi-antenna operation mode is MU-MIMO; and
the method further comprises:
determining that the at least one second DMRS port number is allocated to a second terminal device, wherein the second terminal device is different from the first terminal device.

4. The communication method according to claim 2, wherein
the first multi-antenna operation mode is MU-MIMO, and the second multi-antenna operation mode is SU-MIMO; or
the first multi-antenna operation mode is SU-MIMO, and the second multi-antenna operation mode is SU-MIMO; and
the method further comprises:
determining that the at least one second DMRS port number is not allocated to a second terminal device, wherein the second terminal device is different from the first terminal device.

5. The communication method according to claim 4, wherein N is greater than 1; and
the second information further indicates that a time-frequency resource corresponding to the at least one second DMRS port number is not used for data transmission or is used for data transmission between the first terminal device and the network device.

6. A communication method, comprising:
sending first information to a first terminal device, wherein the first information indicates a first multi-antenna operation mode of the first terminal device, and the first information is carried in radio resource control (RRC) signaling or media access control (MAC) signaling;
sending second information to the first terminal device, wherein the second information indicates at least one DMRS port number and a quantity N of DMRS CDM groups that correspond to a second multi-antenna operation mode of the first terminal device, the N DMRS CDM groups comprise the at least one first DMRS port number, and N is a positive integer, wherein the second information is carried in downlink control information (DCI);

receiving third information from the first terminal device, wherein the third information indicates at least an application scenario or a device type of the first terminal device that corresponds to a third multi-antenna operation mode of the first terminal device; and determining a third multi-antenna operation mode of the first terminal device based on the third information.

7. The communication method according to claim 6, wherein the N DMRS CDM groups further comprise at least one second DMRS port number, and the at least one second DMRS port number is different from the at least one first DMRS port number.

8. The communication method according to claim 7, wherein:
the first multi-antenna operation mode is MU-MIMO, and the second multi-antenna operation mode is MU-MIMO; or
the first multi-antenna operation mode is SU-MIMO, and the second multi-antenna operation mode is MU-MIMO; and
the method further comprises:
determining that the at least one second DMRS port number is allocated to a second terminal device, wherein the second terminal device is different from the first terminal device.

9. The communication method according to claim 6, wherein
the first multi-antenna operation mode is MU-MIMO, and the second multi-antenna operation mode is SU-MIMO; or
the first multi-antenna operation mode is SU-MIMO, and the second multi-antenna operation mode is SU-MIMO; and
the method further comprises:
determining that the at least one second DMRS port number is not allocated to a second terminal device, wherein the second terminal device is different from the first terminal device.

10. The communication method according to claim 9, wherein N is greater than 1; and
the second information further indicates that a time-frequency resource corresponding to the at least one second DMRS port number is not used for data transmission or is used for data transmission between the first terminal device and the network device.

11. A first wireless apparatus, comprising one or more processors; and a memory, wherein the memory stores a computer program, and when executing the computer program stored in the memory, the one or more processors executes operations comprising:
receiving first information from a network device, wherein the first information indicates a first multi-antenna operation mode of a first terminal device, and the first information is carried in radio resource control (RRC) signaling or media access control (MAC) signaling;
receiving second information from the network device, wherein the second information indicates at least one first DMRS port number and a quantity N of demodulation reference signal DMRS CDM groups that correspond to a second multi-antenna operation mode of the first terminal device, the N DMRS CDM groups comprise the at least one first DMRS port number, and N is a positive integer, wherein the second information is carried in downlink control information (DCI);

determining that a multi-antenna operation mode of the apparatus is the second multi-antenna operation mode;

sending third information to the network device, wherein the third information indicates at least an application scenario or a device type of the first terminal device;

receiving fourth information from the network device, wherein the fourth information indicates a third multi-antenna operation mode of the first terminal device based on the third information; and determining that a multi-antenna operation mode of the first terminal device is the third multi-antenna operation mode.

12. The first wireless apparatus according to claim 11, wherein the N DMRS CDM groups further comprise at least one second DMRS port number, and the at least one second DMRS port number is different from the at least one first DMRS port number.

13. The first wireless apparatus according to claim 12, wherein the first multi-antenna operation mode is MU-MIMO, and the second multi-antenna operation mode is MU-MIMO; or the first multi-antenna operation mode is SU-MIMO, and the second multi-antenna operation mode is MU-MIMO; and the one or more processors executes operations further comprising:

determining that the at least one second DMRS port number is allocated to a second wireless apparatus, wherein the second wireless apparatus is different from the first wireless apparatus.

14. The first wireless apparatus according to claim 12, wherein the first multi-antenna operation mode is MU-MIMO, and the second multi-antenna operation mode is SU-MIMO; or the first multi-antenna operation mode is SU-MIMO, and the second multi-antenna operation mode is SU-MIMO; and the one or more processors executes operations further comprising:

determining that the at least one second DMRS port number is not allocated to a second wireless apparatus, wherein the second wireless apparatus is different from the first wireless apparatus.

15. The first wireless apparatus according to claim 14, wherein N is greater than 1; and the second information further indicates that a time-frequency resource corresponding to the at least one second DMRS port number is not used for data transmission or is used for data transmission between the first terminal device and the network device.

16. A wireless apparatus, comprising one or more processors; and a memory, wherein the memory stores a computer program, and when executing the computer program stored in the memory, the one or more processors executes operations comprising:

sending first information to a first terminal device, wherein the first information indicates a first multi-antenna operation mode of the first terminal device, and the first information is carried in radio resource control (RRC) signaling or media access control (MAC) signaling;

sending second information to the first terminal device, wherein the second information indicates at least one DMRS port number and a quantity N of DMRS CDM groups that correspond to a second multi-antenna operation mode of the first terminal device, the N DMRS CDM groups comprise the at least one first DMRS port number, and N is a positive integer, wherein the second information is carried in downlink control information (DCI);

receiving third information from the first terminal device, wherein the third information indicates at least an application scenario or a device type of the first terminal device that corresponds to a third multi-antenna operation mode of the first terminal device; and determining a third multi-antenna operation mode of the first terminal device based on the third information.

17. The apparatus according to claim 16, wherein the N DMRS CDM groups further comprise at least one second DMRS port number, and the at least one second DMRS port number is different from the at least one first DMRS port number.

18. The apparatus according to claim 17, wherein:

the first multi-antenna operation mode is MU-MIMO, and the second multi-antenna operation mode is MU-MIMO; or the first multi-antenna operation mode is SU-MIMO, and the second multi-antenna operation mode is MU-MIMO; and the one or more processors executes operations further comprising:

determining that the at least one second DMRS port number is allocated to a second terminal device, wherein the second terminal device is different from the first terminal device.

19. The apparatus according to claim 16, wherein the first multi-antenna operation mode is MU-MIMO, and the second multi-antenna operation mode is SU-MIMO; or the first multi-antenna operation mode is SU-MIMO, and the second multi-antenna operation mode is SU-MIMO; and the one or more processors executes operations further comprising:

determining that the at least one second DMRS port number is not allocated to a second terminal device, wherein the second terminal device is different from the first terminal device.

20. The apparatus according to claim 19, wherein N is greater than 1; and the second information further indicates that a time-frequency resource corresponding to the at least one second DMRS port number is not used for data transmission or is used for data transmission between the first terminal device and the network device.

* * * * *